(12) United States Patent
Pickering et al.

(10) Patent No.: US 7,056,578 B2
(45) Date of Patent: Jun. 6, 2006

(54) LAYER COMPRISING NONFIBRILLATABLE AND AUTOADHESIVE PLASTIC PARTICLES, AND METHOD OF PREPARATION

(75) Inventors: Jerry A. Pickering, Hilton, NY (US); Theodora Miller, Rochester, NY (US); Thomas M. Plutchak, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 126 days.

(21) Appl. No.: 10/692,440

(22) Filed: Oct. 23, 2003

(65) Prior Publication Data

US 2004/0091715 A1    May 13, 2004

Related U.S. Application Data

(60) Provisional application No. 60/425,632, filed on Nov. 13, 2002.

(51) Int. Cl.
  *B32B 25/02* (2006.01)
  *G03G 15/20* (2006.01)

(52) U.S. Cl. ............ 428/327; 428/421; 428/422; 399/320; 399/333

(58) Field of Classification Search ........... 399/320, 399/333; 428/36.91, 327, 421, 422
  See application file for complete search history.

(56) References Cited

U.S. PATENT DOCUMENTS

| | | | |
|---|---|---|---|
| 3,669,707 A * | 6/1972 | Donnelly | ............... 427/444 |
| 3,795,033 A | 3/1974 | Donnelly et al. | |
| 4,011,362 A | 3/1977 | Stewart | |
| 4,029,827 A | 6/1977 | Imperial et al. | |
| 4,046,795 A | 9/1977 | Martin | |
| 4,101,686 A | 7/1978 | Strella et al. | |
| 4,185,140 A | 1/1980 | Strella et al. | |
| 4,257,699 A | 3/1981 | Lentz | |
| 4,264,181 A | 4/1981 | Lentz et al. | |
| 4,272,179 A | 6/1981 | Seanor | |
| 4,372,246 A | 2/1983 | Azar et al. | |
| 4,503,179 A | 3/1985 | Yoshimura et al. | |
| 4,555,543 A | 11/1985 | Effenberger et al. | |
| 4,568,275 A | 2/1986 | Sakurai | |
| 4,853,737 A | 8/1989 | Hartley et al. | |
| 4,883,717 A | 11/1989 | Kitamura et al. | |
| 5,017,432 A | 5/1991 | Eddy et al. | |
| 5,194,335 A | 3/1993 | Effenberger et al. | |
| 5,217,837 A | 6/1993 | Henry et al. | |
| 5,332,641 A | 7/1994 | Finn et al. | |
| 5,363,180 A | 11/1994 | Shimizu et al. | |
| 5,376,996 A | 12/1994 | Sankaran | |
| 5,464,698 A | 11/1995 | Chen et al. | |
| 5,508,138 A | 4/1996 | Shimizu et al. | |
| 5,519,479 A | 5/1996 | Shimizu et al. | |

(Continued)

FOREIGN PATENT DOCUMENTS

GB    1354471    5/1974

OTHER PUBLICATIONS

Davis et al., U.S. Appl. No. 09/450,302, filed Nov. 29, 1999.

(Continued)

*Primary Examiner*—Ramsey Zacharia
(74) *Attorney, Agent, or Firm*—Carl F. Ruoff

(57) ABSTRACT

A layer for an article, including a fluoroelastomer, and at least about 25 percent by volume nonfibrillatable and autoadhesive plastic particles.

21 Claims, 2 Drawing Sheets

U.S. PATENT DOCUMENTS

| | | | |
|---|---|---|---|
| 5,531,813 | A | 7/1996 | Henry et al. |
| 5,547,742 | A | 8/1996 | Satoh et al. |
| 5,568,239 | A | 10/1996 | Furukawa et al. |
| 5,582,917 | A | 12/1996 | Chen et al. |
| 5,595,823 | A | 1/1997 | Chen et al. |
| 5,599,631 | A | 2/1997 | Chen et al. |
| 5,627,000 | A | 5/1997 | Yamazaki et al. |
| 5,639,549 | A | 6/1997 | Fukunaga et al. |
| 5,641,603 | A | 6/1997 | Yamazaki et al. |
| 5,649,273 | A | 7/1997 | Shimizu et al. |
| 5,729,813 | A | 3/1998 | Eddy et al. |
| 5,780,545 | A | 7/1998 | Chen et al. |
| 5,781,840 | A | 7/1998 | Chen et al. |
| 5,824,416 | A | 10/1998 | Chen et al. |
| 5,846,447 | A | 12/1998 | Beatty |
| 5,935,712 | A | 8/1999 | Tan et al. |
| 5,998,033 | A | 12/1999 | Tan et al. |
| 6,011,946 | A | 1/2000 | Eddy et al. |
| 6,090,491 | A | 7/2000 | Tan et al. |
| 6,114,041 | A | 9/2000 | Tan et al. |
| 6,239,223 | B1 | 5/2001 | Effenberger et al. |
| 6,281,279 | B1 | 8/2001 | Davis et al. |
| 6,355,352 | B1 | 3/2002 | Chen et al. |
| 6,361,829 | B1 | 3/2002 | Chen et al. |
| 6,372,833 | B1 | 4/2002 | Chen et al. |
| 6,416,819 | B1 | 7/2002 | Chen et al. |
| 6,429,249 | B1 | 8/2002 | Chen et al. |
| 6,444,741 | B1 | 9/2002 | Chen et al. |

OTHER PUBLICATIONS

Pickering, U.S. Appl. No. 10/454,897, filed Jun. 5, 2003.
Pickering et al., U.S. Appl. No. 10/454,900, filed Jun. 5, 2003.
Pickering et al., U.S. Appl. No. 10/691,778, filed Oct. 23, 2003.
Pickering et al., U.S. Appl. No. 10/691,779, filed Oct. 23, 2003.

* cited by examiner

LAYER COMPRISING NONFIBRILLATABLE AND AUTOADHESIVE PLASTIC PARTICLES, AND METHOD OF PREPARATION

CROSS-REFERENCE TO RELATED APPLICATIONS

This Application claims benefit under 35 USC §119(e) of prior co-pending U.S. Provisional Patent Application, Ser. No. 60/425,632, filed Nov. 13, 2002. This provisional patent application is incorporated herein in its entirety, by reference thereto.

Filed concurrently with this application are the application entitled "Process for Electrostatographic Reproduction", U.S. application Ser. No. 10/1425,626 filed Oct. 23, 2003, and the application entitled "Fuser Member and Fuser Member Surface Layer", U.S. application Ser. No. 10/1691,779 filed Oct. 23. 2003. These two concurrently filed applications are incorporated herein in their entireties, by reference thereto.

BACKGROUND OF THE INVENTION

1. Field of the Invention

The present invention relates to a layer, particularly a surface layer, and more particularly a coating, for a suitable article, and relates to an article comprising the indicated layer. The invention further relates to a solution, particularly a solution comprising a coating composition for forming the indicated layer. The invention yet additionally relates to a process for preparing the solution, and to a process for preparing the indicated layer from the solution.

The present invention further relates to electrostatographic imaging and recording apparatus, and to assemblies in these apparatus for fixing toner to the substrates. The present invention relates particularly to the article and layer, as discussed, in the forms—respectively—of a fuser member, and a fusing surface layer for fuser members, in the toner fixing assemblies.

2. Description of Background and Other Information

Generally in electrostatographic reproduction, the original to be copied is rendered in the form of a latent electrostatic image on a photosensitive member. This latent image is made visible by the application of electrically charged toner.

The toner thusly forming the image is transferred to a substrate—also referred to in the art as a receiver—such as paper or transparent film, and fixed or fused to the substrate. Where heat softenable toners—for example, comprising thermoplastic polymeric binders—are employed, the usual method of fixing the toner to the substrate involves applying heat to the toner, once it is on the substrate surface, to soften it, and then allowing or causing the toner to cool. This application of heat in the fusing process is preferably at a temperature of about 90° C.–220° C.; pressure may be employed in conjunction with the heat.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

During the fusing process toner can be offset from the substrate to the fuser member. Toner thusly transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is accordingly regarded as contamination of the fuser member, and preventing or at least minimizing this contamination is a desirable objective.

Release agents, such as those comprising polydimethylsiloxanes, can be applied to fusing members during the fusing process, to combat toner offset. However, these agents may interact with the fusing member surface upon repeated use, and in time cause swelling, softening, and degradation of the fuser member.

Other factors also may disadvantageously affect the fusing member. Heat energy applied to this member can cause its degradation. Degradation can also be effected by continual contact with substrate toner, and by toner remaining on the fusing member surface. The fusing member surface can be subjected to abrasion by a variety of sources—such as the substrate, for instance, as well as elements of the fusing system, like the support member, release agent applicator, and contact heating members, if these are employed.

These unfavorable effects can result in an uneven fusing member surface and defective patterns in thermally fixed images. Where the substrate employed is paper, abrasion of the fusing member surface at the paper edge can form a worn area, or groove, that becomes problematic when the paper size is changed so that a larger paper overlaps the worn area. When the groove becomes deep enough to affect the fixing of the toner it causes objectionable image defects.

Where high image quality, and/or high image gloss, and/or controlling fusing member surface roughness are required, surface wear and abrasion are particular problems. For instance, if obtaining very high image quality is the objective, even a groove only worn into the surface enough to show a variation in surface gloss will nevertheless generate an objectionable defect in the image. Preventing or minimizing wear accordingly likewise is a desirable objective.

Heavily filled silicone rubber, used for fuser member surfaces, is known to produce high quality fused images. The polysiloxane elastomers have relatively low surface energies and also relatively low mechanical strengths, but are adequately flexible and elastic. Unfortunately, silicone rubbers wear easily when employed for this purpose; after a period of use, the action of the paper or other media passing through a high pressure nip wears a polysiloxane elastomer fuser surface. The silicone rubbers' low wear resistance as fuser member surfaces accordingly limits fuser member life. Further, although treatment with a polysiloxane release fluid during use of the fuser member enhances its ability to release toner, the fluid causes the silicone rubber to swell. This fluid absorption is a particular factor that shortens fuser member life; fluid treated portions tend to swell and wear and degrade faster. Fuser members with polysiloxane elastomer fusing surfaces accordingly have a limited life.

Fluorocarbon materials also have low surface energies, and, like silicone rubbers, are used as release surface materials for fuser members. Polyfluorocarbons employed for this purpose include nonelastomeric fluorocarbon materials, or fluoroplastics, and fluoroelastomer materials. However, there are disadvantages associated with the use of both.

In fact, the fluorocarbon resins like polytetrafluoroethylene (PTFE), and copolymers of tetrafluoroethylene (TFE) and perfluoroalkylvinylether (PFA), and fluorinated ethylene propylene copolymers, have excellent release characteristics due to very low surface energies. They also are characterized by high temperature resistance, excellent resistance to chemical interaction, and low wear (high abrasion resistance).

However, these materials are particularly susceptible to offset, due to high modulus and poor surface contact with rough substrates. Fluorocarbon resins also are less flexible and elastic than polysiloxane elastomers, and are unsuitable for producing high image quality images.

Yet additionally, fluorocarbon resins, having the indicated typically high modulus, cannot evenly contact rough papers, as noted. They therefore provide varying gloss within the same image.

This gloss variation may be referred to as mottled gloss. The poor contact, related (as indicated) to high modulus, also tends to produce images with objectionable offset.

Specifically, with a high modulus there will be objectionable mottled gloss as well as objectionable offset. Contact may be improved by the use of a thin fusing surface layer; however, a surface sleeve is limited to a certain minimum thickness when used in conjunction with an underlying soft cushion, because repeated compression results in sleeve wrinkling.

Fluoroelastomers, besides their low surface energy as indicated, have excellent wear resistance as fusing member surfaces. They provide better durability in this regard than the polysiloxane elastomers, and unlike the silicone rubbers, do not swell when in contact with polysiloxane release fluids.

However, fluoroelastomers have less resistance to chemical interaction than either silicones or fluoroplastics, and must be used in conjunction with reactive release fluids. As release fluids are subject to disruption or failure, fluoroelastomers are always at risk of irreversible contamination.

This is particularly a problem with polyester toners that may contain reactive sites on the toner surface. If the toner encounters the fluoroelastomer surface, the toner may chemically interact with the surface. If this interaction occurs the toner may not be easily removed, and will tend to attract more toner, leading to roller failure.

Inorganic fillers have been incorporated into fluoroelastomer surface layers to achieve the desired combination of properties like wear resistance, modulus, and thermal conductivity. Particularly, it is known that certain fillers may be used to reinforce the elastomer and further enhance the wear resistance of fluoroelastomers.

However, it is also known that the presence of inorganic filler particles, in the fluoroelastomer fusing surface layers of fuser members, provides high energy sites for removing toner from the substrate. In addition, inorganic fillers are typically extremely hard and abrasive to other elements of the toner fusing system that contact the fuser member.

It is further difficult to provide surface layers which are suitably free of defects, and which—in combination with high wear resistance—have a sufficiently high gloss, or are otherwise of the requisite degree of smoothness. Particularly it is difficult to provide surface layers with these desirable properties where the layers are obtained by application of the fluoroelastomer composition in solution, especially where the layers are built up to the desired thickness by applying successive coats.

Considering the foregoing, it would be desirable to provide a fusing member fluoroelastomer surface that retains the indicated advantages of fluoroelastomers, while also minimizing the tendency to acquire irreversible toner contamination. Especially with respect to fillers, it would be desirable that the tendency of the filler to cause toner offset be minimized, while the filler also enhances the wear resistance of the fluoroelastomer; further, it would be desirable to have fillers that do not wear contacting members.

In this regard, it is known to use PTFE as a filler for fusing surface layers. With PTFE and similar fluororesins being recognized as having low adhesion, good chemical resistance, and low coefficients of friction, there have been many attempts to combine these fluororesins with other materials used in fusing surface layers.

For instance, U.S. Pat. Nos. 3,669,707 and 3,795,033 disclose a fuser roller having a silicone elastomer surface that incorporates fluorinated resin filler, such as fibrillatable Teflon powder. U.S. Pat. No. 4,568,275 discloses a fuser roller with a surficial layer prepared from an aqueous dispersion comprising fluorinated rubber and fluorinated resin. U.S. Pat. No. 5,376,996 discloses a fuser roller with a coating comprising a mixture of polyphenylene sulfide and polytetrafluoroethylene. U.S. Pat. No. 5,547,742 discloses a fuser roller having a surface layer comprising a fluorosilicone rubber and 5 to 50 weight percent of a fluororesin, such as polytetrafluoroethylene.

Further, U.S. Pat. No. 4,503,179 discloses an aqueous fluorine-containing rubber coating composition comprising a fluorine-containing rubber, a fluorine-containing resin, and an aminosilane. U.S. Pat. Nos. 4,555,543 and 5,194,335 disclose a film forming fluid coating or casting composition, comprising a fluoroplastic resin dispersion modified by a fluoroelastomer latex.

As with any polymer, the properties of PTFE are a function of, inter alia, molecular weight and method of preparation. And in fact, polytetrafluoroethylene can present different processing problems, depending upon the molecular weight of the PTFE being employed.

For instance, standard PTFE is an extremely high molecular weight polymer, on the order of 10,000,000, which cannot be melt processed due to the very high viscosity of the melt. Particularly for the purpose of the present invention, when polytetrafluoroethylene particles are subjected to shear, the desired result is for the particles to separate, and especially to disperse uniformly, or at least essentially uniformly. However, in this molecular weight range the PTFE is fibrillatable; when subjected to shear, it does not separate, but instead forms into fibers.

Specifically, granular powders which are composed of PTFE in this 10,000,000 molecular weight range rapidly undergo a process of fibrillation, which forms highly reinforcing fibers; these fibers make traditional processing methods inadequate. And the more the fibrillatable particles are sheared, the greater the fibrillation.

A reason for this fibrillation being especially undesirable—for the fusing surface layers of fuser members—is that many of the resulting fibers would be exposed, at the top of the layer. It has long been recognized that while PTFE is chemically inert, the surface may be adhered to by means of mechanical interlocking. Mechanical interlocking of toner melt with a fibrous surface would similarly be a concern.

Nonfibrillatable and autoadhesive polytetrafluoroethylene, in the molecular weight range of from about 25,000 to about 250,000, can be prepared by degradation of standard PTFE. One method which can be used to accomplish this degradation is mechanical shear. Another is chain scission by means of high energy bombardment.

The nonfibrillatable and autoadhesive form of PTFE can be dry compounded with fluoroelastomer. However, when thusly incorporated with the fluoroelastomer, only relatively small amounts of this PTFE can be used.

For instance, to avoid problems during milling and processing, the proportion of nonfibrillatable and autoadhesive polytetrafluoroethylene, particularly in the form of micropowders, that can be mechanically combined with fluoroelastomer is limited to about 25 percent by weight of the fluoroelastomer.

Further, if the dry compounded PTFE and fluoroelastomer composition is to be used for preparing a coatable solution, the proportion of PTFE must be still less. A proper solution can be obtained only where the nonfibrillatable and autoadhesive PTFE comprises about 5 percent or less by weight of the fluoroelastomer.

Specifically, with PTFE particles blended into a fluoroelastomer using dry blending methods, an amount of this PTFE higher than the indicated upper limit of about 5 weight percent results in a compounded composition that does not dissolve uniformly in appropriate solvents—particularly, a compounded composition that is unable to form a desirable coating. Attempted solutions, or dispersions, prepared from compositions with above about 5 weight percent of the nonfibrillatable and autoadhesive PTFE, will contain large agglomerates, and therefore be unsuitable for coating.

Ultralow molecular weight (ULMW) telomers of PTFE have been prepared synthetically and used as lubricants. As opposed to the foregoing nonfibrillatable and autoadhesive polytetrafluoroethylene, ULMW PTFE—having a molecular weight of from about 4,000 to about 25,000—can be used in amounts greater than the preceding weight percent limitations.

In this regard, U.S. Pat. No. 5,599,631 discloses a fuser member with an outermost layer that is a substantially homogeneous composite. This composite comprises a fluorocarbon elastomer as a continuous phase, and a fluorinated resin, having a molecular weight between about 4,000 and 25,000, as a discontinuous phase. The ratio of fluorocarbon elastomer to fluorinated resin is stated to range from 8:1 to 1:8. Compounding of fluorocarbon elastomer and fluorinated resin on a 2 roll mill, to obtain the desired composite, is disclosed; thusly obtained composites are dispersed in polar coating solvents, such as ketones and acetates, for coating on fuser members.

Accordingly, not only can ULMW PTFE indeed be compounded in high proportions with fluoroelastomer, but coatable solutions can be prepared from these high proportion ultralow molecular weight polytetrafluoroethylene compositions. However, the applicability of ULMW PTFE is limited. It is more expensive than the nonfibrillatable and autoadhesive PTFE, and is typically only available in the form of dispersions. In contrast, nonfibrillatable and autoadhesive PTFE is desirable, due to its lower cost, and availability in various particle sizes and dry powder forms.

Regarding the indicated difference between the properties of nonfibrillatable and autoadhesive PTFE and ULMW PTFE in fluoroelastomer—i.e., with respect to the much greater proportion of ULMW PTFE which not only can be dry compounded with fluoroelastomer, but also can be present in the dry compounded compositions used to prepare solutions—it is believed that the ultralow molecular weight polytetrafluoroethylenes are essentially pure crystalline compounds, which can fracture, but will not join together unless heated past their melting point. Thus, with ULMW PTFE particles in a medium, such as a fluoroelastomer or a solvent, shear will cause only the particles to disperse; even at high concentrations, with the shearing action bringing particles into contact with relative frequency, they will not join but instead will remain separate, so that the shearing action also moves them apart.

It is further believed that, in contrast, nonfibrillatable and autoadhesive PTFE has both a crystalline component and a substantial amorphous component that is cohesive—so that if PTFE particles are mechanically forced together with amorphous portions of different particles in contact, the particles will be joined by these amorphous components. Accordingly, if the PTFE concentration is high enough, the shearing action will bring amorphous components, of different PTFE particles, into merging contact with sufficient frequency so that particle masses will form.

U.S. Pat. No. 6,239,223 discloses a blended solid composition comprising a fibrillatable microparticulate polytetrafluoroethylene and a fluoroelastomer; also disclosed is a blended solid composition comprising a low molecular weight, nonfibrillatable polytetrafluoroethylene and a fluoroelastomer, wherein the nonfibrillatable polytetrafluoroethylene is present at greater than 35 percent by weight, based on total polymer solids of the composition. These blended compositions are isolated from an aqueous system by a low shear process. Use of a high molecular weight polytetrafluoroethylene, that can undergo fibrillation and thus reinforce the blend matrix, is indicated to be desirable.

While the indicated use of aqueous dispersions allows high levels of polytetrafluoroethylene in fluorocarbon elastomers to be obtained, aqueous dispersions limit both the curing methods as well as the range of additives. The surfactants required are also undesirable, particularly for fuser member applications. Additionally, fibrillation may be undesirable in a fuser member coating, as the wear surface would contain such strain induced fibers. It has long been recognized that while PTFE is chemically inert, adherence to PTFE particle surfaces may be effected by means of mechanical interlocking. Mechanical interlocking of toner melt with a fibrous surface would similarly be a concern.

Thus it is an object of this invention to provide a fusing surface layer that is uniform and defect free—or at least essentially uniform and at least essentially defect free—and that comprises a curable fluoroelastomer and a nonfibrillatable, autoadhesive polytetrafluoroethylene that has excellent resistance to paper abrasion and toner offset. It is further an object of this invention to provide a fusing surface layer that is of uniform—or at least essentially uniform, or at least substantially uniform—composition within, that is easily prepared, and that is resistant to shear during preparation. It is further an object of this invention to provide a surface layer that can be prepared from a compounded fluoroelastomer composition, and that is suitable for bisphenol type cure systems.

It is further an object of this invention to provide a method for producing a fusing surface layer having the desirable characteristics as indicated. It is further an object of this invention to provide a coating composition for producing a fusing surface layer having the desirable characteristics as indicated, with the coating composition also characterized by an exceptionally long solution life.

SUMMARY OF THE INVENTION

It has been discovered that, with respect particularly to nonfibrillatable and autoadhesive PTFE, a much greater amount of this form of polytetrafluoroethylene, relative to the amount of fluoroelastomer, can be dispersed into a solution—particularly, into a coating solution, and still more particularly, into a curable coating solution—where both (1) the PTFE is added to the solvent or solvents separately from the fluoroelastomer, rather than having been incorporated therewith, and also (2) the combination comprising one or more solvents, PTFE, and fluoroelastomer is mixed under high shear. It has further been discovered that where at least about 80 percent by weight of the one or more solvents comprises an acetate or acetates, a very long solution life is achieved.

As to the foregoing, the invention pertains to a layer, preferably a surface layer, for an article; the layer comprises a fluoroelastomer, and further comprises at least about 25 percent by volume nonfibrillatable and autoadhesive plastic particles. Preferably the particles are dispersed uniformly, or at least essentially uniformly, in the layer—preferably, in the fluoroelastomer.

Also a matter of preference, the layer as indicated is a fusing surface layer, and the article is a fuser member. Accordingly, in a particularly preferred embodiment, the invention pertains to a fuser member for a toner fusing system or process, with the fuser member comprising a base and a fusing surface layer, and with this fusing surface layer comprising the layer as indicated.

The fusing surface layer of the invention is characterized by excellent wear and excellent release, and particularly is resistant to offset from polyester toners.

The invention further pertains to a method for preparing a solution. This method comprises separately adding, to solvent, a composition comprising a fluoroelastomer, and nonfibrillatable and autoadhesive plastic particles, then mixing the resulting combination of solvent, fluoroelastomer composition, and plastic particles under high shear. Preferably the solvent comprises at least about 80 percent by weight of at least one acetate.

DESCRIPTION OF THE INVENTION

Figure 1:
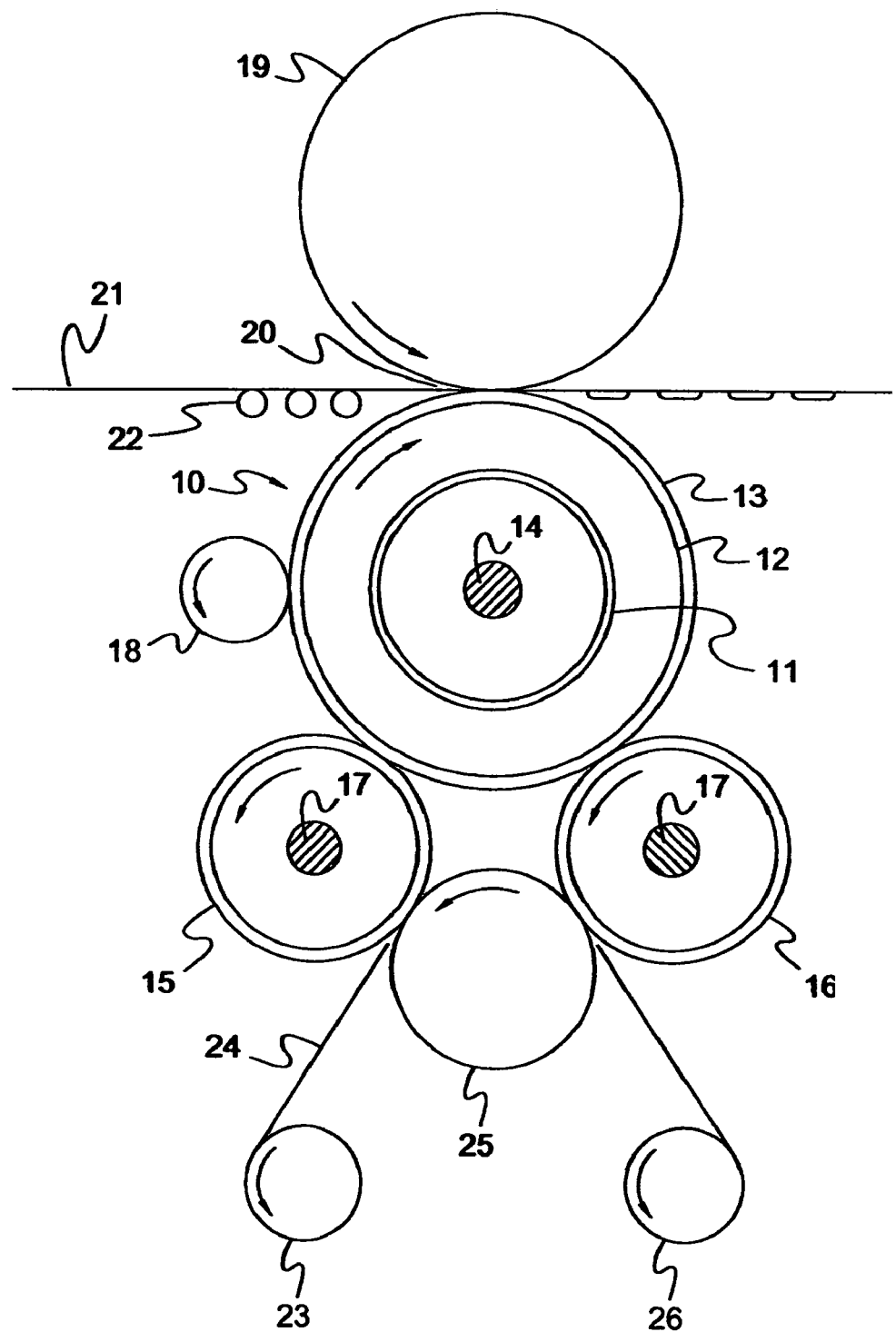
FIG. 1 is a schematic representation, and a sectional view, of a toner fusing assembly of the invention.

Copolymers are understood as including polymers incorporating two monomeric units, i.e., bipolymers, as well as polymers incorporating three or more different monomeric units, e.g., terpolymers, quaterpolymers, etc.

Polyorganosiloxanes are understood as including functional and nonfunctional polyorganosiloxanes. Polyorganosiloxanes further are understood as including polydiorganosiloxanes—i.e., having two organo groups attached to each, or substantially each, or essentially each, of the polymer siloxy repeat units. Polyorganosiloxanes yet further are understood as including polydimethylsiloxanes.

Functional polyorganosiloxanes are understood as being polyorganosiloxanes having functional groups on the backbone, connected to the polysiloxane portion, which can react with fillers present on the surface of the fuser member, or with a polymeric fuser member surface layer or component thereof. Functional polyorganosiloxanes further are understood as being polyorganosiloxanes having functional groups such as amino, hydride, halo (including chloro, bromo, fluoro, and iodo), carboxy, hydroxy, epoxy, isocyanate, thioether, and mercapto functional groups. Nonfunctional polyorganosiloxanes further are understood as being polyorganosiloxanes without groups of the type as indicated.

The term "organo" as used herein, such as in the context of polyorganosiloxanes, includes "hydrocarbyl", which includes "aliphatic", "cycloaliphatic", and "aromatic". The hydrocarbyl groups are understood as including the alkyl, alkenyl, alkynl, cycloalkyl, aryl, aralkyl, and alkaryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen. Preferred organo groups for the polyorganosiloxanes are the alkyl, aryl, and aralkyl groups. Particularly preferred alkyl, aryl, and aralkyl groups are the $C_1$–$C_{18}$ alkyl, aryl, and aralkyl groups, particularly the methyl and phenyl groups.

Fusing or operating temperatures are understood as being within the range of from about 90° C., or about 120° C., or about 150° C., to about 200° C., or about 220° C., or about 250° C. The preferred temperatures are generally within the range of from about 120° C. to about 200° C., more preferably from about 150° C. to about 175° C., still more preferably from about 150° C. to about 185° C.

Unless stated otherwise, modulus is measured as tensile modulus of elasticity, using dynamic mechanical analysis, at a frequency equal to the frequency of the fuser member. The fuser member frequency pertains to the 360° rotation of the member—in the case of fuser members that operate in the fusing process by rotation (e.g., fuser members with bases in the form of cylindrical cores, or of belts on rollers, or of core-mounted plates)—and in the case of other fuser members, to their equivalent movement.

Unless stated otherwise, molecular weights set forth herein are number average molecular weights ($M_n$), measured in Daltons.

Equilibrium surface roughness is the property of a layer whereby the wearing away of the layer at its surface regenerates a surface with the same, or at least essentially the same, degree of roughness. Specifically with regard to fuser members, the equilibrium surface roughness—of the fuser member's fusing surface layer—is the surface roughness where the degree of roughness remains unchanged, or essentially unchanged, as use of the fuser member in the fusing process proceeds. At equilibrium surface roughness, wearing away of the fusing surface layer at its surface regenerates a surface with the same, or essentially the same, degree of roughness.

Autoadhesion, with respect to the nonfibrillatable and autoadhesive plastic particles of the invention, is the property whereby, upon being subjected to dry compounding with a two roll mill under the conditions set forth herein, the particles will sinter together. Sintering in this regard is the act of two or more discrete particles becoming fused together into one particle. During the sintering of two autoadhesive particles, the surface between them—defining the separation between the particles—becomes indistinguishable; the two originally distinct particles, previously having no bond or strong physical link or connection, obtain an adhesion therebetween that is sufficient to prevent them from separating when dispersed in a solvent and subjected to shear. Particularly, the solvent preferably does not significantly swell or otherwise dissolve the particles.

Accordingly, autoadhesive particles, under the milling as indicated, will sinter together to form aggregates that will not uniformly disperse in a solvent. Typical autoadhesive particles include noncrystalline and semicrystalline materials near or above their glass transition temperatures at milling conditions. Semicrystalline materials with very small amounts of amorphous component may not be autoadhesive. Crystalline materials that melt or are brought very close to their melt point at milling conditions may be autohesive.

In a particular embodiment, the invention pertains to a layer. This layer may be in the form of a coating.

The layer of the invention comprises at least one polyfluorocarbon elastomer, or fluoroelastomer, and plastic particles. Particularly, the layer comprises a polyfluorocarbon elastomer, or fluoroelastomer, having nonfibrillatable and autoadhesive plastic particles dispersed in the layer—preferably, dispersed in the polyfluorocarbon elastomer, or fluoroelastomer—as filler.

Also as a matter of preference, the layer of the invention is uniform, or at least essentially uniform, or homogeneous, or at least essentially homogeneous. Especially, the plastic particles preferably are uniformly, or at least essentially uniformly, dispersed in the layer—correspondingly, preferably dispersed uniformly, or at least essentially uniformly, in the polyfluorocarbon elastomer, or fluoroelastomer. And further as a matter of preference, this uniform—or at least essentially uniform—dispersion is such that surface preparation, surface finishing, wear during use, or other abrasion, results in the same composition at the surface of the layer. Particularly, this uniform—or at least essentially uniform—dispersion is such as to provide the layer with an equilibrium surface roughness.

Yet additionally as a matter of preference, the layer of the invention comprises a layer, preferably a surface layer, for a suitable article. The invention accordingly can comprise an article that comprises the indicated surface layer, or an article and a surface layer as indicated for the article, with the indicated surface layer residing on the article.

In a particular embodiment of the invention, the indicted article comprises a fuser member for a toner fusing system or process, and the indicated surface layer comprises a fusing surface layer for the fuser member. In this embodiment the fuser member includes a fuser base, and further includes the fusing surface layer as indicated overlaying the fuser base. This fusing surface layer can reside directly on the fuser base. Alternatively, there can be one or more materials and/or layers, including one or more cushion layers, interposed between the fuser base and the fusing surface layer.

The plastic particles of the invention are nonfibrillatable and autoadhesive plastic particles. Particularly as to their nonfibrillatability, during handling and dispersal into the fluoroelastomer, the particles accordingly will not form reinforcing fibers that raise viscosity or clog coating devices; further, when the particles are subjected to wear and abrasion, those at the top of the fusing surface layer do not form fibers that provide attachment sites for toner melt.

Still additionally in this regard, the plastics of the particles are of low enough molecular weight so as to be thusly nonfibrillatable. Yet further, they are of high enough molecular weight so as to retain their shape during handling and dispersal into solvent; this feature is important for obtaining coatings, and particularly layers, with uniform surface roughness.

Further regarding the plastic particles of the invention, the plastics are understood as including noncrosslinked plastics, and also as including resins, particularly inelastic resins, and crosslinked resins. Fluoroplastics are preferred, as are fluororesins, or nonelastomeric fluorocarbons.

Fluororesins that are suitable include polytetrafluoroethylenes (PTFE), and fluorinated ethylene propylenes (FEP), including copolymers of tetrafluoroethylene and hexafluoropropylene, as well as copolymers of tetrafluoroethylene and ethylene, and copolymers of tetrafluoroethylene and perfluoroalkyl vinyl ether (PFA). The polytetrafluoroethylenes are the preferred fluororesins.

PTFE particles have low surface energy, and correspondingly a low propensity for removing toner from the substrate. They also do not have the abrasiveness of inorganic filler particles, and therefore do not subject sensors and skives, or other such contacting elements, to wear. Nevertheless, the PTFE particles themselves impart good wear resistance to fusing surface layers.

Polytetrafluoroethylenes including one or more additional monomers in minor amounts, such as up to about 5 mole percent, may be used. Suitable such additional monomers include fluorocarbons, chlorocarbons, hydrofluorocarbons, hydrochlorocarbons, fluoroethers, and hydrofluoroethers, and particularly perfluoroalkylvinylethers. Specific examples are hexafluoropropylene and n-perfluoropropylvinylether.

Particularly preferred polytetrafluoroethylenes—including those comprising one or more additional monomers in minor amounts, such as up to about 5 mole percent—are those having a molecular weight of from about 25,000 to about 250,000. Polytetrafluoroethylenes in this molecular weight range—i.e., which can be referred to as low molecular weight (LMW) PTFE—are desirable due to their low cost, and their availability in various particle sizes, and dry powder form.

Accordingly, the preferred nonfibrillatable and autoadhesive plastic particles of the invention are nonfibrillatable and autoadhesive polytetrafluoroethylene particles. And the polytetrafluoroethylenes having a molecular weight of from about 25,000 to about 250,000 are particularly preferred.

A method for preparing LMW PTFE from higher molecular weight polytetrafluoroethylene is by gamma or electron beam irradiation of the latter, such as disclosed in U.S. Pat. No. 5,846,447 and Great Britain Patent Specification No. 1,354,471, which are incorporated herein in their entireties, by reference thereto. Another method, as discussed herein, is by mechanical shear degradation of the higher molecular weight polytetrafluoroethylene.

Commercially available LMW polytetrafluoroethylenes which are suitable for the invention include the following: Zonyl® MP1100, MP1000, and MP1300, from DuPont Fluoroproducts, Wilmington, Del.; Dyneon® 9207, from Dyneon L.L.C., Oakdale, Minn.; Algoflon® FSA EX, from Ausimont USA, Inc., Thorofare, N.J.; and M270 and M290, from Shamrock Technologies Inc., Newark, N.J.

The plastic particles—particularly, the PTFE particles—of the invention preferably have a mean particle diameter of from about 0.05 microns, or about 0.1 microns, to about 20 microns, or about 30 microns, or about 50 microns. In the case of fusing surface layers, a factor in determining the size of the plastic particles to be used is the surface roughness which is desired. Smaller particle sizes provide the greatest wear reduction, but also produce a very smooth coating; particularly, small sized particles, such as in the range of about 2 microns, will generate a very high gloss, defect free surface. Larger particle sizes may be used to reduce the coating smoothness, and thus the resulting output image gloss; particles of sufficient size will provide a low gloss surface. Plastic particles in the form of indentor particles, as disclosed in the application identified herein as U.S. application Ser. No. 10/1691,779 filed Oct. 23, 2003, are suitable for the invention.

The plastic particles can comprise at least about 25 percent by volume, or at least about 30 percent by volume, or at least about 33 percent by volume, or at least about 35 percent by volume, or at least about 43 percent by volume, of the layer of the invention. Further, the plastic particles can comprise from about 25 percent by volume, or about 30 percent by volume, or about 33 percent by volume, or about 35 percent by volume, or about 43 percent by volume, to about 60 percent by volume, or about 64 percent by volume, or about 65 percent by volume, or about 67 percent by volume, or about 70 percent by volume, of the layer of the invention.

The layer of the invention can comprise at least about 40 parts, or at least about 60 parts, or at least about 80 parts, or at least about 100 parts, of plastic particles per 100 parts by weight fluoroelastomer. Further, the layer of the invention can comprise from about 40 parts, or about 60 parts, or about 80 parts, or about 100 parts, to about 200 parts, or about 220 parts, or about 240 parts, or about 280 parts, or about 300 parts, of plastic particles per 100 parts by weight fluoroelastomer.

The plastic particles can comprise at least about 26 percent by weight, or at least about 31 percent by weight, or at least about 35 percent by weight, or at least about 40 percent by weight, either of the combined weight, in the layer of the invention, of the plastic particles and the fluoroelastomer, or, in the layer of the invention, of the combined weight of the plastic particles, the fluoroelastomer, and 12 parts MgO per 100 parts by weight fluoroelastomer. Further, the plastic particles can comprise from about 26 percent by weight, or about 31 percent by weight, or about 35 percent by weight, or about 40 percent by weight, to about 66 percent by weight, or about 68 percent by weight, or about 71.4 percent by weight, either of the combined weight, in the layer of the invention, of the plastic particles and the fluoroelastomer, or, in the layer of the invention, of the combined weight of the plastic particles, the fluoroelastomer, and 12 parts MgO per 100 parts by weight fluoroelastomer.

Particularly with respect to the nonfibrillatable and autoadhesive PTFE particles of the invention, increasing the proportion of the PTFE particles, in the fusing surface layer of the invention, results in greater offset resistance for the layer. Resistance to wear also is improved as the proportion of this PTFE increases, up to and including the range of about 150 parts to about 200 parts per 100 parts by weight fluoroelastomer, and the range of about 43 percent by volume to about 62 percent by volume, and the range of about 40 percent by weight to about 66 percent by weight—this latter range being based upon the combined weight as indicated; within these ranges, the highest levels of wear resistance are achieved.

Optimum wear resistance accordingly occurs at unusually high PTFE proportions. The improved wear resistance at very high nonfibrillatable and autoadhesive PTFE levels is completely unexpected.

Specifically, fluoroelastomer fusing surface layers with typical inorganic filler show increasing wear at filler levels beyond 25 volume percent, whereas for layers with non-fibrillatable and autoadhesive PTFE, wear rates continue to drop until about the indicated 150–200 pph, or 43–60 vol. %, or 40–66 wt. % ranges. This result is completely unexpected, since overpacking the elastomer with fillers typically produces a layer which has very poor qualities, and often crumbles with handling.

In addition to nonfibrillatable and autoadhesive plastic particles, the layer of the invention may further include one or more other fillers for one or more other purposes. Different fillers may be used for such purposes as conducting heat, improving toner offset and release properties of the fusing surface layer, controlling material properties such as wear resistance and surface roughness, modifying hardness, and imparting other characteristics, such as desired mechanical properties, to the fusing surface layer; among the fillers which may be included are reinforcing fillers.

Particularly, one or more inorganic fillers may be included. Inorganic fillers that may be used include $SnO_2$, SiC, CuO, ZnO, $Al_2O_3$, FeO, $Fe_2O_3$, WC, BN, and amorphous silica, such as precipitated silica and fumed silica.

The inorganic particles preferably have a mean particle diameter of from about 0.1 microns, or about 0.2 microns, to about 20 microns, or about 30 microns, or about 40 microns. Inorganic particles in the form of indentor particles, as disclosed in the application identified herein as U.S. application Ser. No. 10/1691,779 filed Oct. 23, 2003, may be used.

However, inorganic filler particles are characterized by high surface energy. As stated, in fusing surface layers they provide sites to take up toner, and they have the potential of wearing elements of the toner fusing system, such as sensors and skives, that contact the fuser member surface; with respect to the matter of offset, the propensity for adherence to toner can be minimized, but the tendency for toner to stick remains.

Accordingly, particularly with the fusing surface layer of the invention, it is desirable to minimize the amount of inorganic filler present therein. And particularly to minimize the tendency of inorganic filler to attract toner offset, it is desirable either, as indicated, that the amount of inorganic filler be minimized, or that the inorganic filler have been treated with coupling agent, as discussed.

Inorganic filler therefore may comprise up to about 18 percent by volume, or up to about 20 percent by volume—such as from about 0.5 percent by volume, or about 1 percent by volume, to about 18 percent by volume, or about 20 percent by volume—of the fusing surface layer of the invention. However, where the inorganic filler has been treated with coupling agent, it may comprise up to about 30 percent by volume, more preferably up to about 25 percent by volume, of the fusing surface layer of the invention. And even in the case of coupling agent-treated inorganic filler, still more preferably only up to about 20 percent by volume is used.

Yet further, as a matter of particular preference, inorganic filler, whether or not coupling agent-treated, comprises not more than about 10 percent by volume—more preferably not more than about 5 percent by volume—of the fusing surface layer of the invention.

The nonfibrillatable and autoadhesive plastic particles, and any other fillers, particularly inorganic fillers, present in the layer of the invention, may be in one or more of any suitable shapes—irregular, as well as in the form of spheroids, platelets, flakes, powders, ovoids, needles, fibers, and the like. With respect to particles employed for the purpose of providing thermal conductivity, and—for fuser members of the invention, the layer of the invention being a fusing surface layer—particularly in such instance and where internal heating is employed, an irregular shape is more preferred, as are spherical particles and platelets, so as to maximize the heat conducting effect of the filler particles; fibers, needles, and otherwise elongated shapes are less preferred here, unless they are advantageously oriented, because in certain alignments they are less effective for properly conducting heat.

In this regard, elongated particles are more efficient for conducting heat in the proper direction if they are at right angles to the fuser base—radially aligned, if the fuser base is a cylindrical core, belt on rollers, or a core-mounted plate, but less efficient if they are positioned parallel to the core—axially aligned, if the fuser base is a core, a belt, or is core mounted as indicated. Accordingly, to maximize heat conducting properties where elongated heat conducting particles are employed, perpendicular (radial) positioning is preferred, while parallel (axial) alignment may be employed but is not preferred.

Discontinuous phase material, as disclosed in the application identified herein as U.S. application Ser. No. 10/1425,626 filed Oct. 23, 2003, can also be included in the layer of the invention—particularly, in its final form, dispersed in the layer, and especially through the fluoroelastomer, in the form of domains. Preferably the discontinuous phase comprises at least one polymer. Preferred polymers for the discontinuous phase are the elastomers.

Among the elastomers that may be used are perfluoropolyethers, fluoroelastomers, and particularly silicones, such as fluorosilicones. Suitable silicone elastomers include those that may be used for the optional one or more cushion layers, as discussed.

Suitable fluoroelastomers include those that may be used for the continuous phase of the fusing surface layer, as discussed. Where the discontinuous phase comprises a fluoroelastomer, the fluoroelastomers of the continuous and discontinuous phases must be such that, at the temperature of the fusing process, the modulus of the fluoroelastomer continuous phase is greater than the discontinuous phase modulus, and the difference between the modulus of the fluoroelastomer continuous phase and the modulus of the discontinuous phase is sufficiently great, and the modulus of the discontinuous phase is sufficiently low, so that the requisite gloss level is achieved, as discussed.

The discontinuous phase material can be provided, for use in preparing the fusing surface layer, already in final form, and in this final form, serve as the domains dispersed in fluoroelastomer. Particularly, the discontinuous phase material may be provided already in particulate form.

In this regard, the elastomers as indicated may be provided as preformed particles. Particularly, preformed silicone elastomer particulate may be used. The silicone elastomer particles are crosslinked particles of polydiorganosiloxane, preferably polydimethylsiloxane, elastomer.

The silicone elastomer particulate can be prepared by emulsion polymerization, or from bulk silicone by grinding, or otherwise reducing the material to discrete particles. Particularly, the crosslinked polydiorganosiloxane—e.g., polydimethylsiloxane—particles can be obtained using condensation or addition cure methods. Preparation preferably involves the reaction of a vinyl dimethyl terminated polydimethylsiloxane having a number average molecular weight of from about 2,000 to about 20,000, and either a polymethylhydrosiloxane or a methyl hydro, dimethylsiloxane copolymer, having a number average molecular weight of from about 300 to about 3,000; also as a matter of preference, the ratio of hydride to vinyl groups is from about 1:1 to about 2:1.

The silicone elastomer particles particularly can be prepared in accordance with the procedures set forth in U.S. Pat. No. 6,281,279; accordingly, the silicone elastomer particles as disclosed in U.S. Pat. No. 6,281,279 can be used. This patent is incorporated herein in its entirety, by reference thereto.

In a preferred embodiment, the silicone elastomer particles are in a core-shell configuration, comprising a silicone resin shell surrounding the silicone elastomer core. The shell is expected to provide the particle with a surface of higher hardness to the particle, which will also have a higher surface energy. This surface treated preformed silicone particulate may have better adhesion with the surrounding elastomer matrix, while retaining the advantage of added silicone rubber.

The surface treatment, to provide the shell portion of the core-shell configuration, can be performed in situ by adding an aminosilane to the coating preparation. The amount of aminosilane added is from about 0.1 percent by weight to about 5 percent by weight of the silicone particles. Preferably the aminosilane has the formula

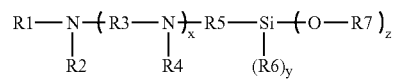

wherein
R$^1$ and R$^2$ are the same or different, and are selected from the group consisting of hydrogen and C$_1$–C$_8$ hydrocarbyl groups;
R$^3$ is a C$_1$–C$_8$ hydrocarbyl group;
R$^4$ is selected from the group consisting of hydrogen and C$_1$–C$_6$ hydrocarbyl groups;
R$^5$ is a C$_3$–C$_8$ hydrocarbyl group;
R$^6$ and R$^7$ are the same or different, and are selected from the group consisting of C$_1$–C$_8$ hydrocarbyl groups;
x is 0 to 2;
y is 0 to 2;
z is 1 to 3; and
y+z is 3.

Commercially available silicone particulates that are suitable for the invention include 52-854, X-52-875, KMP597, and KMP598, from Shin-Etsu Silicones of America, Inc., Akron, Ohio. A commercially available core-shell configuration silicone particulate that is suitable is KMP600, also from Shin-Etsu Silicones.

The material—e.g., the one or more polymers—that becomes the discontinuous phase, particularly elastomers used for this purpose, may be employed in cured form, or in curable form, such as a curable liquid or gum. Where employed in curable form, the material is cured by the curing of the fusing surface layer of the invention, to provide the discontinuous phase domains; particularly, the curing of the layer effects crosslinking of curable polymer that is present.

Among the curable silicone elastomers that may be employed are peroxide cure silicone elastomers and vinyl addition cure silicone elastomers. Particularly preferred for the discontinuous phase are the curable siloxane polymers, particularly the curable polyfunctional poly($C_{1-6}$ alkyl) siloxane polymers, disclosed in U.S. Pat. No. 5,582,917, which is incorporated herein in its entirety, by reference thereto.

A preferred commercially available curable siloxane polymer is SFR-100 silicone, from GE Silicones, Waterford, N.Y. SFR-100 silicone is characterized as a silanol- or trimethylsilyl-terminated polymethylsiloxane, and is a liquid blend comprising about 60–80 weight percent of a difunctional polydimethylsiloxane having a number average molecular weight of about 150,000, and 20–40 weight percent of a polytrimethylsilyl silicate resin having monofunctional (i.e. trimethylsiloxane) and tetrafunctional (i.e. $SiO_2$) repeating units in an average ratio of between about 0.8 and 1 to 1, and having a number average molecular weight of about 2,200.

The curable elastomers, and particularly the curable siloxane polymers, can be employed in the amount of up to about 50 parts, or up to about 60 parts, or up to about 80 parts, per 100 parts by weight of the fluoroelastomer. Particularly, the curable elastomers, and more particularly the curable siloxane polymers, may be used in the amount of from about 5 parts, or about 10 parts, to about 50 parts, or about 60 parts, or about 80 parts, or about 100 parts, per 100 parts by weight of the fluoroelastomer.

At fuser operating conditions, or at the temperature of the fusing process, or at the fusing temperature, the domains of the discontinuous phase preferably have a modulus of about $8\times10^6$ Pa or less, or about $10\times10^6$ Pa or less, or from about $0.5\times10^6$ Pa, or about $0.8\times10^6$ Pa, or about $1\times10^6$ Pa, to about $4\times10^6$ Pa, or about $8\times10^6$ Pa, or about $10\times10^6$ Pa. The discontinuous phase domains preferably have a mean diameter—particularly in the case of the particulate, a mean particle diameter—of from about 0.1 microns, or about 0.2 microns, or about 0.5 microns, or about 1 micron, to about 10 microns, or about 15 microns, or about 30 microns, or about 40 microns, or about 50 microns, or about 60 microns, or about 80 microns. Further, the discontinuous phase domains can have a mean diameter—particularly in the case of the particulate, a mean particle diameter—of at least about 2 microns, or at least about 5 microns, or at least about 8 microns, or from about 2 microns, or about 5 microns, or about 8 microns, to about 10 microns, or about 15 microns, or about 30 microns, or about 40 microns, or about 50 microns, or about 60 microns, or about 80 microns.

Discontinuous phase domain size—particularly where preformed particles are employed, and especially in the case of silicone elastomer particulate—may be used to control the surface roughness of the layer, and accordingly, with fusing surface layers of the invention, the gloss of images produced in the toner fusing process. Corresponding to how the size of the nonfibrillatable and adhesive plastic particles affects the invention, smaller domain sizes—particularly in the range of about 0.1 to 2.0 microns, such as with silicone elastomer particlese—will contribute to providing smoother surfaces and higher gloss. Contrastingly, larger domain sizes will help in reducing image gloss, an advantage of which is that low gloss images hide defects such as those generated by oil streaks.

Larger domain sizes also help in reducing smoothness, and accordingly in bringing about an increased equilibrium surface roughness. However, increasing discontinuous domain size past a certain point—about 2.0 microns—contributes to increased wear of the layer; in this instance not only is a poor wear rate provided, but the wear rate worsens as domain size increases.

But the larger domain sizes in fact do not bring about this disadvantageous effect on wear rate if the nonfibrillatable and adhesive plastic particles also are present in the layer. The nonfibrillatable and adhesive plastic particles, particularly where present in high levels, provide very low wear rates even when used with discontinuous phase domains of large size.

So with the nonfibrillatable and adhesive plastic particles being employed, a good wear rate is obtained with either, or both, large and small discontinuous phase domains. Accordingly, large discontinuous phase domains can be present, such as for the purpose of achieving low gloss, without adversely affecting wear rate.

The discontinuous phase can be present, in the fusing surface layer, in an amount of from about 10 parts, or about 20 parts, or about 30 parts, or about 40 parts, or about 50 parts, to about 80 parts, or about 100 parts, or about 120 parts, or about 150 parts, per 100 parts by weight of the fluoroelastomer continuous phase. Also, the fusing surface layer can comprise at least about 20 parts, or at least about 30 parts, or at least about 40 parts, or at least about 50 parts, discontinuous phase per 100 parts by weight of the fluoroelastomer continuous phase. Yet additionally, the discontinuous phase can comprise at least about 10 percent by volume, or at least about 15 percent by volume, or at least about 20 percent by volume, or at least about 25 percent by volume, or at least about 30 percent by volume, or at least about 35 percent by volume, or at least about 40 percent by volume, of the fusing surface layer.

The material for forming the discontinuous phase—provided already in final form, or provided in curable form, to be cured to form the domains—can be included with the fluoroelastomer composition that is added to the solvent. However, preferably the material for forming the discontinuous phase is added to the solvent separately from the fluoroelastomer composition, as discussed herein.

The nonfibrillatable and autoadhesive plastic particles of the invention are dispersible in, but insoluble in, the solvents used for preparing the coating preparations of the invention; in this regard, the nonfibrillatable and autoadhesive plastic particles must be insoluble even to the extent that the solvents cannot make the particles adhere to one another due to softening. Preferably, discontinuous phase material that, when employed, is already in final form—e.g., preformed particulate—and any other fillers, particularly inorganic fillers, that are employed, also are dispersible and insoluble in the indicated solvents; these optional materials preferably also are insoluble even to the extent that the solvents cannot make the particles adhere to one another due to softening. Solvent accordingly acts as a dispersant vehicle for the nonfibrillatable and autoadhesive plastic particles—and preferably also for the final formed discontinuous phase material and any other fillers, if employed.

Yet additionally, the nonfibrillatable and autoadhesive plastic particles of the invention, and the indicated final form discontinuous phase material and any other fillers that are employed, are heat stable at fusing or operating temperatures. Particularly, these materials preferably are heat stable at fusing process temperatures—e.g., within the range of from about 90° C., or about 120° C., or about 150° C., to about 200° C., or about 220° C., or about 250° C. Accordingly, the discontinuous phase material and filler preferably are heat stable at temperatures of up to at least about 90° C., more preferably up to at least about 120° C., still more preferably up to at least about 150° C., still more preferably up to at least about 200° C., still more preferably up to at least about 220° C., or even up to at least about 250° C.

This heat stability entails the absence, or at least the essential absence or substantial absence, of degradation, decomposition, sublimation, and release of byproducts, and of change in shape, size, or state of matter. And indentor particles, where employed, in addition to being thusly heat stable, also undergo no melting, or essentially or substantially no melting, at the temperatures as indicated.

Particularly with respect to the fluoroplastic and fluororesin nonfibrillatable and autoadhesive plastic particles, and solvent of the invention, these polyfluorocarbon plastic particles, by nature of their desirable low surface energy and inertness, do not interact with the solvent. However, preferably the fluoroplastic and fluororesin nonfibrillatable and autoadhesive plastic particles are wettable by solvent of the invention. Particularly, preferably the fluoroplastic and fluororesin nonfibrillatable and autoadhesive plastic particles have sufficient surface energy so as to be wet by solvent of the invention.

If the surface energy, of the fluoroplastic and fluororesin nonfibrillatable and autoadhesive plastic particles, is so low that they are not wet by the solvent, then the quality of the resulting coating—of the article layer, such as in the case of a fuser member fusing surface layer—may be adversely affected. Fluoroplastic and fluororesin nonfibrillatable and autoadhesive plastic particles that are not wet by the solvent will tend to aggregate into clusters. This tendency may lead to coating nonuniformity, to a deficiency of uniformity in the resulting article layer; it will contribute to coating roughness, to a propensity for the formation of cracks and/or crazes, and in some cases to reduced wear properties.

One means for determining wettability as indicated is by combining the particles with pure solvent, and dispersing the particles therein, such as by shaking. If the particles are not wet by the pure solvent, then a surface film of particles will form at the air/solvent interface. Conversely, if the particles are wet by the solvent, then upon combination with the pure solvent and agitation, they will not leave a significant surface film.

Another method for ascertaining whether the particles are wettable is by pressing a pellet, and observing the solvent contact angle. Still a third method is by capillary wicking.

The fluoroplastic and fluororesin nonfibrillatable and autoadhesive plastic particles that are prepared by electron beam irradiation are thought to form surface acidic groups; these groups may aid in the wetting of the particles by the solvent. It is known that surface group formation is dependent on the intensity of the irradiation dose, as disclosed in U.S. Pat. No. 5,846,447.

For improving the wear resistance and release properties of the layer, particularly the fusing surface layer, of the invention, one or more of the materials which are used for preparing the layer of the invention, and which are reactive with SiOH groups, may be compounded with a coupling agent—preferably a silane coupling agent, as discussed in U.S. Pat. No. 5,998,033. Materials suitable for this treatment include inorganic fillers and cocuratives.

As to this matter, herein it is disclosed that the materials which are compounded, for subsequent combination with solvent and formation of the layer of the invention, include the fluoroelastomer. Where the layer also incorporates inorganic filler particles, they as well are included in the dry compounding treatment. And if cocurative additionally is being employed, it also may be included in this treatment. Accordingly, where one or more SiOH group-reactive materials, as indicated, are present, the requisite amount of coupling agent yet additionally can be included in the compounding of these materials.

Instead of compounding with coupling agent, one or more of the SiOH group-reactive materials may be surface treated with a coupling agent—here also preferably a silane coupling agent, as discussed in U.S. Pat. Nos. 5,935,712, 6,090,491, and 6,114,041. The coupling agent can be dissolved in an appropriate solvent, and surface treatment can be effected by steeping the material in this solution; ultrasonication can be employed during this treatment. After treatment the material is washed and dried. In the case of silane, preferably the treatment solution is prepared by adding about 2 weight percent of this coupling agent to a solvent comprising 95 percent by volume ethanol and 5 percent by volume water, and stirring for ten minutes. The material is covered by the solution and ultrasonicated for ten minutes. The material then is separated by vacuum filtration, rinsed with ethanol, and thereafter oven dried at 150° C., for 18 hours under reduced pressure (vacuum).

It is understood that both the surface treatment and the compounding, as discussed, are included in referring to treatment with coupling agent. It is further understood that both material compounded with coupling agent, and material surface treated with coupling agent, are included in referring to the resulting product as coupling agent-treated material.

Particularly as to the silane coupling agents, 3-aminopropyltriethoxysilane is a silane which may be employed. However, the secondary amine functional silanes are preferred, because they have relatively less of an unfavorable impact upon pot life. Suitable secondary amine functional silanes include N-phenylaminopropyltrimethoxysilane, N-phenylaminopropyltriethoxysilane, 3-[2-N-benzylaminoethylaminopropyltrimethoxysilane, and 3-[2-N-benzylaminoethylaminopropyltriethoxysilane. Also among the silanes that may be used are the styryl-functionalized silane coupling agents disclosed in U.S. Pat. No. 6,090,491.

The treatment with coupling agent serves to improve layer wear resistance and release properties. This treatment therefore has particular utility for the fusing surface layer of the invention.

U.S. Pat. Nos. 5,998,033, 5,935,712, 6,090,491, and 6,114,041 are incorporated herein in their entireties, by reference thereto.

Yet other additives and adjuvants also may be used with the fluoroelastomer, as long as they do not affect the integrity thereof, or significantly interfere with an activity intended to occur in the layer—such as the crosslinking of the fluoroelastomer. These further additives and adjuvants, where present, are provided in amounts and proportions as are generally known or as can be determined without undue experimentation by those of ordinary skill in the art. Suitable examples include crosslinking agents, processing aids, accelerators, polymerization initiators, and coloring agents.

Particularly with respect to the toner fusing system and the toner fusing process—and correspondingly the fuser member—of the invention, the fuser base may be any of those as are known in the art. As a suitable embodiment, the fuser base may be a core in the form of a cylinder or a cylindrical roller, particularly a hollow cylindrical roller. In this embodiment the fuser base may be made of any suitable metal, such as aluminum, anodized aluminum, steel, nickel, copper, and the like. Also appropriate are ceramic materials and polymeric materials, such as rigid thermoplastics, and thermoset resins with or without fiber enforcement. Preferably the roller is an aluminum tube or a flame sprayed aluminum coated steel tube.

Alternatively, the fuser base may be a plate. Materials suitable for the core may also be used for the plate.

One embodiment of a fuser base in the plate form is a curved plate mounted on a larger cylindrical roller—that is, larger than a cylindrical roller which itself is employed as a fuser core. Being thusly curved, the plate accordingly has the shape of a portion of a cylinder. Additionally, the plate can be removably mounted on the cylindrical roller, so that the plate can be replaced without also requiring replacement of the roller. In this embodiment, the properties discussed herein with reference to the fuser base pertain only to the portion of the cylindrical roller occupied by the attached plate; the rest of this roller is not involved in the fusing of toner to substrate.

As yet another alternative, the fuser base may be a belt, particularly an endless flexible belt. A thin belt made of a suitable metal, such as those indicated for the core and plate forms; the belt may also be made of a polyamide or a polyimide, particularly a heat resistant polyamide or polyimide. A polyimide material appropriate for the belt is commercially available under the trademark Kapton, from DuPont High Performance Films, Circleville, Ohio.

Preferably the belt is mounted on rollers, which can be cores of the type as discussed herein. As a matter of preference two rollers are utilized with the belt, each of these two rollers defining a different one of the curves around which the belt passes.

A support member for the fusing system and process likewise may be any of those as are known in the art; particularly, it can be a backup roller, also referred to as a pressure roller. The support member can be in the form of a roller, plate, or belt, in the same manner as is suitable for the fuser base; particularly, cores suitable for the fuser member may also be used for the support member. Where the support member is a belt, preferably it is mounted on rollers, in the same manner as—for the fuser base in the form of a belt.

In any of the indicated forms, the support member may have mounted thereon a cushion for forming the nip with the fuser member. Suitable cushion materials include those having at least some degree of temperature resistance, such as silicone and EPDM elastomers. In the absence of yet a further layer in turn being mounted on the cushion, this cushion also serves to contact the substrate, and accordingly to cooperate with the fuser member.

Alternatively or in addition to the cushion, the support member may have mounted thereon a thin fluoroplastic surface layer, such as a Teflon or PFA layer, overlaying the surface that cooperates with the fuser member. Where both the cushion and the thin fluoroplastic surface layer are present on the support member, the cushion is situated between the support member and the surface layer.

Preferably the fuser base is in the form of a cylindrical roller, with the fuser member correspondingly in the form of a roller—specifically, a fuser roller. Also as a matter of preference, the support member comprises a backup roller.

Further in the toner fusing system and process of the invention, internal heating and/or external heating may be employed. Heating means as are known in the art are suitable. Preferably, the means of providing heat for fusing toner and substrate comprise the heating of the fuser member by one or more external and/or internal heating sources, and transmission of this heat from the fuser member to the toner, or to both toner and substrate—preferably by contact.

Where there are one or more materials and/or layers, including one or more cushion layers, interposed between the fuser base and the fusing surface layer, they may be those as are known in the art. Where there is at least one cushion layer, the at least one cushion layer can include one or more thermally conductive cushion layers and/or one or more thermally nonconductive cushion layers.

When used, the at least one cushion layer particularly can be that as disclosed in U.S. application Ser. No. 09/879,585, filed Jun. 12, 2001; this application is incorporated herein in its entirety, by reference thereto. Generally, the thickness of the at least one cushion layer is about 20 millimeters or less, preferably from about 1 to about 10 millimeters.

Among the materials which can be used for the at least one cushion layer are suitable silicone elastomers, such as appropriate thermally conductive silicone elastomers and thermally nonconductive silicone elastomers. Addition cure, condensation cure, and peroxide cure silicone elastomers can all be used, with addition cure silicone elastomers and condensation cure silicone elastomers being preferred.

Further, silicone elastomers formulated as room temperature vulcanizate (RTV), liquid injection moldable (LIM), and high temperature vulcanizate (HTV) silicone elastomers can be used. RTV and LIM silicones are preferred.

A highly desired property for the silicone elastomers is heat stability. Particularly for cushion layer silicone elastomers, this property is characterized by low compression set, resistance to hardening or softening over time, and resistance to tear propagation from heat aging.

In particular, compression set is permanent deformation. Low compression set, or good compression set resistance, is required for the desired shape of the fuser roller to be maintained.

Two particular silicone elastomers which may be used are Silastic™-J silicone, from Dow Corning Corporation, Midland, Mich., and a silicone commercially available under the designation EC4952 from Emerson & Cuming ICI, Billerica, Mass.

In a process which may be used for application of at least one cushion layer, the fuser base optionally can first be degreased and surface roughened. If these functions are performed, they may be accomplished by grit blasting. Except as discussed otherwise herein, the fuser base surface, whether or not initially degreased and roughened, is primed with conventional primer, such as Dow™ 1200 RTV Prime Coat primer, from Dow Corning Corporation, and material for forming a cushion is subsequently applied thereto.

To form a cushion layer, silicone elastomer is molded, particularly by injection, or extruded or cast onto the fuser base to the desired thickness. Curing is then effected. For a RTV silicone, this is accomplished by allowing it to sit at room temperature.

After curing, conventionally the silicone layer is subjected to a post cure, which improves compression set resistance. Typically a post cure is conducted at a temperature of around 200° C., or about 150–200° C., or about 200–230° C., or as high as about 240° C., for a period of about 1–2 hours, or for about 4 hours, or for about 24 hours, or for a period of about 4–48 hours.

Each silicone cushion layer is subjected to cure, and preferably also to post cure, before application of the next layer, except in the case of the last silicone layer to be laid down. For this finally applied silicone cushion layer, the coating preparation for forming the fusing surface layer is first laid down and then cured at a raised temperature for a period of time, as discussed.

This curing of the coating preparation serves as the post cure for the silicone cushion layer on which it is deposited. Delaying the post cure of the last cushion layer in this manner allows maximum adhesion between the cushion and the fusing surface layer to develop.

Where only one silicone cushion layer is employed, since it is also the last cushion layer to be laid down, it is not post cured until the coating preparation is applied, in accordance with the foregoing.

Before the coating preparation for forming the fusing surface layer is applied, the cushion material can be ground to a desired profile, depending upon the paper handling concerns to be addressed. For instance, a cylinder shape, or a crown, or barrel, or bow tie, or hourglass profile may be provided.

Addition cure silicone elastomers typically employ a platinum catalyst; condensation cure silicone elastomers, a tin catalyst. Tin catalysts will poison platinum catalysts, but the reverse is not true. Accordingly, where sequential addition and condensation cure silicone elastomer layers are employed, a condensation cure layer can be applied onto an addition cure layer, but not vice versa.

Suitable fluoroelastomers for the layer of the invention include random polymers comprising two or more monomeric units, with these monomeric units comprising members selected from a group consisting of vinylidene fluoride [—($CH_2CF_2$)—], hexafluoropropylene [—($CF_2CF(CF_3)$)—], tetrafluoroethylene [—($CF_2CF_2$)—], perfluorovinylmethyl ether [—($CF_2CF(OCF_3)$)—], and ethylene [—($CH_2CH_2$)—]. Among the fluoroelastomers that may be used are fluoroelastomer copolymers comprising vinylidene fluoride and hexafluoropropylene, and terpolymers as well as tetra- and higher polymers including vinylidene fluoride, hexafluoropropylene, and tetrafluoroethylene monomeric units. Additional suitable monomers include perfluorovinylalkyl ethers, such as perfluorovinylmethyl ether.

Preferred fluoroelastomers include random polymers comprising the following monomeric units:

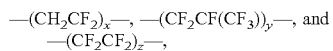
—$(CH_2CF_2)_x$—, —$(CF_2CF(CF_3))_y$—, and —$(CF_2CF_2)_z$—, wherein x is from about 30 to about 90 mole percent,
y is from about 10 to about 60 mole percent, and
z is from about 0 to about 42 mole percent.

Further preferred fluoroelastomers are random polymers comprising the following monomeric units:

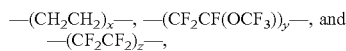
—$(CH_2CH_2)_x$—, —$(CF_2CF(OCF_3))_y$—, and —$(CF_2CF_2)_z$—, wherein x is from about 0 to about 70 mole percent,
y is from about 10 to about 60 mole percent, and
z is from about 30 to about 90 mole percent The fluoroelastomers, as discussed, may further include one or more cure site monomers. Among the suitable cure site monomers are 4-bromoperfluorobutene-1, 1,1-dihydro-4-bromo-perfluorobutene-1, 3-bromoperfluorobutene-1, and 1,1-dihydro-3-bromoperfluoropropene-1. When present, cure site monomers are generally in very small molar proportions. Preferably, the amount of cure site monomer will not exceed about 5 mole percent of the polymer.

The fluoroelastomer molecular weight is largely a matter of convenience, and is not critical to the invention. However, as a matter of preference, the fluoroelastomers have a number average molecular weight of from about 10,000 to about 200,000. More preferably they have a number average molecular weight of from about 50,000 to about 100,000.

Commercially available fluoroelastomers which may be used are those sold under the trademark Viton® by Dupont Dow Elastomers, Stow, Ohio; they include Viton® A, Viton® B, Viton® E, Viton® GF, Viton® GH, Viton® GFLT, Viton® B 50, Viton® B 910, Viton® E 45, Viton® E 60C, and Viton® E 430. Also suitable are the Tecnoflons®, such as T838K, FOR-THF, FOR-TFS, FOR-LHF, NM, FOR-60KIR, TH, TH505, and FOR4391, from Ausimont USA, Inc., Thorofare, N.J., and the Fluorel™ fluoroelastomers, such as FE5840Q, FX9038, FX2530, FLS5840Q, FLS2690, FC2230, FC2145, FT2430, Fluroel 2170, Fluorel 2174, Fluorel 2177, Aflas (a polypropylene-tertafluoroethylene), and Fluorel II L11900 (a polypropylene-tetrafluoroethylene vinylidene fluoride), from Dyneon L.L.C., Oakdale, Minn.

Appropriate fluoroelastomers include those as identified in U.S. Pat. Nos. 4,372,246, 5,017,432, 5,217,837, and 5,332,641. These four patents are incorporated herein in their entireties, by reference thereto.

The Viton® A, Viton® GF, FE5840Q, and FX9038 fluoroelastomers are particularly preferred.

Fluoroelastomer preferably comprises from about 20 percent by volume to about 70 percent by volume of the fluoroelastomer compositions used to prepare coating preparations of the invention. Fluoroelastomer likewise preferably comprises from about 20 percent by volume to about 70 percent by volume of layers of the invention.

For preparation of the layer of the invention, one or more curing agents or curatives are employed in a suitable amount to effect curing of the fluoroelastomer. Suitable curatives for the fluoroelastomer include nucleophilic addition curing systems. Also appropriate as curatives are free radical initiator curing systems.

Preferred nucleophilic addition curing systems for the fluoroelastomer are the bisphenol curing systems. These preferably include at least one bisphenol crosslinking agent and at least one accelerator.

Suitable bisphenol crosslinking agents include 4,4-(hexafluoroisopropylidene)diphenol, also known as bisphenol AF, and 4,4-isopropylidenediphenol. Accelerators which may be employed include organophosphonium salt accelerators such as benzyl triphenylphosphonium chloride.

The amount of bisphenol crosslinking agent used, and likewise the amount of accelerator used, each is preferably from about 0.5 parts to about 10 parts per 100 parts by weight of the fluoroelastomer. A bisphenol curing system, taken as a whole, is employed in an amount, based on the total weight of crosslinking agent and accelerator, likewise of from about 0.5 parts to about 10 parts per 100 parts by weight of the fluoroelastomer. A commercially available bisphenol curing system which may be used is Viton® Curative No. 50 from Dupont Dow Elastomers, which is a combination of bisphenol AF and one or more quaternary phosphonium salt accelerators; this curative preferably is used in an amount of from about 2 parts to about 8 parts per 100 parts by weight of the fluoroelastomer.

Further nucleophilic addition curing systems are polyfunctional hindered curing systems, particularly diamine curing systems. Among the diamine curing systems that may be employed are diamine carbamate curing systems. Examples of these are hexamethylenediamine carbamate and N,N'-dicinnamylidene-1,6-hexanediamine; these are commercially available as DIAK No. 1 and DIAK No. 3, respectively, from E.I. Du Pont de Nemours, Inc. DIAK No. 4 is another polyfunctional hindered diamine curing system that may be used.

Free radical initiator curing systems which may be used include peroxide free radical initiator curing systems. Preferably these comprise at least one peroxide free radical initiator, and at least one suitable crosslinking agent; peroxides that may be employed for this purpose include the suitable aliphatic peroxides.

Particular peroxides which may be used include ditertiary butyl peroxide, dicumyl peroxide, 2,4-dichlorobenzoyl peroxide, 2,5-dimethyl-2,5-di(t-butyl peroxy)hexane, dibenzoyl peroxide and the like. Particular crosslinking agents suitable for these systems include triallyl cyanurate, triallyl isocyanurate, and others known in the art.

Where the curative comprises a nucleophilic addition curing system or a free radical initiator curing system, one or more cocuratives may also be employed. In this regard, the use of these systems for curing fluoroelastomers can generate hydrogen fluoride. Accordingly, acid acceptors for neutralizing the hydrogen fluoride are suitable cocuratives. Preferred examples of these acid acceptors are the Lewis bases, particularly inorganic bases such as alkali and alkaline earth metal bases. Preferred bases include magnesium oxide, zinc oxide, lead oxide, calcium oxide, and hydroxides including calcium hydroxide, magnesium hydroxide, potassium hydroxide and sodium hydroxide. Hydrides may also be employed including sodium borohydride and lithium aluminum hydride.

Also suitable as a cocurative is the cocurative system disclosed in U.S. application Ser. No. 09/450,302, filed Nov. 29, 1999. This application is incorporated herein in its entirety, by reference thereto.

The amount of cocurative which is used preferably is from about 1 part, or about 2 parts, to about 20 parts, per 100 parts by weight of the fluoroelastomer. Particularly where one or more acid acceptors are employed, the amount used is preferably that which is sufficient to neutralize the indicated hydrogen fluoride and allow for complete crosslinking.

An excessive amount of cocurative, particularly in the case of the more basic curatives such as calcium hydroxide, will shorten the life of the coating solution used to prepare the layer of the invention, as discussed herein. Specifically, cocurative excess will cause rapid viscosity increase and solution gellation.

Magnesium oxide, calcium hydroxide, and zinc oxide are preferred acid acceptors. Particularly for solution coatings, magnesium oxide and zinc oxide are preferred acid acceptors.

A fluoroelastomer composition, used for making the coating preparation of the invention, can comprise the fluoroelastomer, and also can include one or more of those of the curative, cocurative, adjuvant, and additive components that are being employed. In a preferred embodiment, the fluoroelastomer composition comprises the fluoroelastomer and cocurative.

And where filler other than the nonfibrillatable and autoadhesive plastic particles—particularly, inorganic filler—is being employed, this other filler yet additionally can be included in the fluoroelastomer composition. The nonfibrillatable and autoadhesive plastic particles of the invention are not included in the fluoroelastomer composition.

The fluoroelastomer composition may be formed by any means suitable for combining the components. An appropriate method of mechanical milling or incorporation, or compounding, and particularly a dry compounding method, is preferred, such as two roll milling or shear mixing, as in an internal mixer like a Banbury® mixer, from Farrel Corporation, Ansonia, Conn.

Dry compounding most preferably is conducted with a two roll mill. It may be carried out at a temperature of from about 40° F. to about 200° F., or from about 50° F. to about 100° F. However, preferably the compounding is conducted at approximately room temperature, for example, from about 50° F. to about 70° F. (from about 10° C. to about 21° C.), more preferably from about 55° F. to about 65° F. (from about 13° C. to about 28° C.). This operation tends to generate heat, so preferably a mill with its operating temperature inhibited by some means, such as by water cooling, is employed. The materials are compounded until a uniform, dry, flexible composite sheet is obtained.

Commercially provided fluoroelastomers often come with curatives already incorporated therein. However, for solution coating it is preferred that the curative not be provided in this manner, but rather be employed as a separate component.

Although curative, as such a separate component, may be included in the fluoroelastomer composition—e.g., dry compounded with the other indicated components—preferably it is not, but rather is separately added to the one or more solvents to which the fluoroelastomer composition and nonfibrillatable and autoadhesive plastic particles also are added. Particularly, the curative preferably is added directly to the coating preparation prior to coating. Withholding the curative thusly for addition to the final coating preparation greatly extends the shelf life of this preparation.

For forming the requisite layer on the fuser member, the fluoroelastomer composition and the nonfibrillatable and autoadhesive plastic particles both are combined with suitable solvent. Specifically in the case of the fluoroelastomer composition obtained from dry compounding, this composition is divided into pieces; being thusly in pieces, the fluoroelastomer composition, and the indicated plastic particles, are added to a sufficient amount of the indicated suitable solvent, which comprises one or more solvents, to provide a coating preparation—a composition, and with the presence of the curative particularly a curable composition, and still more particularly a curable solution, which is suitable for use as a coating.

The plastic particles and the fluoroelastomer composition are added to the solvent separately. In being added separately, they may be added simultaneously, but preferably the plastic particles are added either before or after the addition of the fluoroelastomer composition.

Further components may also be employed. Although they can be included in the preparation of the fluoroelastomer composition, preferably they are added to the solvent.

For instance, discontinuous phase material, where employed, may be included at this point. In fact, whether provided in final form—e.g., as preformed particulate—or in curable form—like the curable siloxane polymers discussed herein, to be crosslinked by the curing of the layer of the invention—preferably the discontinuous phase material is added directly to the solvent.

Further, one or more of the polydiorganosiloxane oligomers, particularly the α,ω difunctional polydiorganosiloxanes, disclosed in U.S. Pat. No. 4,853,737, may be used; this patent is incorporated herein in its entirety, by reference thereto. These polydiorganosiloxanes may be employed in the amount of from about 0.1 grams to about 5 grams per 100 grams of solution.

If both curable siloxane polymer and polydiorganosiloxane oligomer, as discussed, are employed, it is preferable that they be kept separate prior to addition to the solvent, because the polydiorganosiloxane oligomers catalyze the crosslinking of the curable siloxane polymers.

Yet additionally, one or more yet additional additives and/or adjuvants can be added to the solution, such as defoaming agents, wetting agents, and other materials. These yet additional adjuvants and fillers, where present, are provided in amounts and proportions as are generally known or as can be determined without undue experimentation by those of ordinary skill in the art.

The amount of solvent used is preferably that which will provide a solution having a solids content of from about 5 weight percent to about 50 weight percent, more preferably from about 10 weight percent to about 30 weight percent.

Water is not employed as a solvent with the present invention; the one or more solvents of the invention are nonaqueous solvents. Accordingly, water is absent, or at least essentially absent, from the solvent or solvents, and from the solution formed therefrom, and thusly from the coating preparation.

Suitable solvents include polar solvents and organic solvents, and particularly solvents which are both polar and organic, such as ketones, esters, and acetates. Ketones that can be used include acetone, methyl ethyl ketone (MEK), and methyl isobutyl ketone. Preferred esters are the $C_1$–$C_8$ acetates, such as the $C_2$–$C_8$ acetates—e.g., ethyl acetate, n-propyl acetate, isopropyl acetate, n-butyl acetate, isobutyl acetate, t-butyl acetate, and sec-butyl acetate.

As indicated, one or more solvents may be employed. Particularly, a mixture of two or more solvents can be used.

For instance, a solvent that can be used is one comprising about 50 weight percent each of methyl ethyl ketone and methyl isobutyl ketone. Yet other solvents which may be used are blends of methyl ethyl ketone and methanol (MeOH), such as blends comprising about 85 percent by weight methyl ethyl ketone and about 15 percent by weight methanol (85:15 MEK:MeOH). Methanol is used to extend the solution life of the coating, or to improve the coating quality.

Further in this regard, a very long solution life, without the formation of a gel, can be obtained where the solvent comprises at least about 80 percent by weight of one or more acetates. More preferably here, the one or more acetates comprise at least about 85 percent by weight of the solvent. And still more preferably, the solvent consists of, or consists at least essentially of, one or more acetates.

One or more solvents other than acetates thusly can be used together with the indicated one or more acetates. Solvents suitable for this purpose include MeOH, and also all of the solvents, besides acetates, that are suitable for the present invention. The preferred solvents for use with one or more acetates are MeOH and MEK.

Moreover, with respect to inorganic filler and/or cocurative which has been treated with coupling agent—particularly silane coupling agent—as discussed, the presence of this treated inorganic filler and/or cocurative will not unfavorably affect solution properties, such as the long solution life provided by the at least 80 percent by weight acetate solvent. However, in the case of inorganic filler that is not coupling agent-treated, if too much of this thusly untreated inorganic—particularly metal oxide—filler is used, then there will be an adverse result.

Specifically, untreated inorganic filler will not unfavorably affect solution life. But the presence of inorganic filler not treated with coupling agent, in amounts beyond a certain proportion, will reduce wear resistance—i.e., will cause the wear resistance, of the coating or layer formed from the solution, to be reduced—as compared to the wear resistance of coatings or layers derived from similar solutions having ketone solvents.

And the wear resistance reduction will occur even with the untreated inorganic filler being provided as part of the fluoroelastomer composition. Particularly, the reduction in wear resistance takes place even despite dry compounding of the inorganic filer with the fluoroelastomer, before addition to the indicated acetate solvent.

The reason for this adverse effect is not fully understood. However, it is believed that the reduced wear resistance is due to a high affinity of the solvent for the filler surface, with the acetate thought to interact strongly with the high surface energy filler, and interaction between the filler and the fluoroelastomer thereby being reduced. Surface treatment of the inorganic—particularly, metal oxide—filler may provide a barrier, improve interaction with the fluoroelastomer, or otherwise prevent the solvent from reducing the interaction of the fluoroelastomer with the filler particles.

So to preserve wear resistance, where the at least about 80 percent acetate solvent is employed, the amount of untreated inorganic filler must be kept to within certain limits. In this regard, with solvent comprising at least about 80 percent by weight acetate, and where inorganic filler not treated with coupling agent is being used, if the amount of the untreated inorganic filler is such that this untreated filler will comprise not more than about 10 percent by volume, preferably not more than about 5 percent by volume, of the layer prepared from the solution, then the untreated filler should have little or no impact on wear properties. This is also the case where the amount of cocurative—particularly where the cocurative comprises one or more of magnesium oxide, magnesium hydroxide, and zinc oxide—that is being employed comprises from about 1 part, or from about 2 parts, to about 20 parts, per 100 parts by weight of the fluoroelastomer.

Accordingly, with a solution where the solvent comprises at least about 80 percent by weight acetate, and where inorganic filler that has not been treated with coupling agent is included, the amount of this untreated inorganic filler in the solution preferably will be such that it comprises about 10 percent or less by volume, more preferably about 5 percent or less by volume, of the layer of the invention prepared from the solution. Particularly, where the solvent comprises at least about 80 percent by weight acetate, and where cocurative is being employed in the amount of from about 1 part, or from about 2 parts, to about 20 parts, per 100 parts by weight of the fluoroelastomer, then here also the amount of the untreated inorganic filler preferably will be such that it comprises about 10 percent or less by volume, more preferably about 5 percent or less by volume, of the layer of the invention prepared from the solution.

Further where the solvent comprises at least about 80 percent by weight acetate and inorganic filler not treated with coupling agent is included, the sum—of the amount of the untreated inorganic filler and the amount of cocurative also not treated with coupling agent—preferably will be such that the combined amount of untreated filler and untreated cocurative comprises about 15 percent or less by volume of the layer of the invention prepared from the solution. More preferably the sum of untreated filler and untreated cocurative will be such that their combined amount comprises about 10 percent or less by volume of the layer.

And as a matter of particular preference where the solvent comprises at least about 80 percent by weight acetate, cocurative is used—preferably comprising one or more of magnesium oxide, magnesium hydoxide, and zinc oxide—and the cocurative may be treated with coupling agent or may be untreated, but otherwise there is no employment of inorganic filler, particularly metal oxide filler, that is not treated with coupling agent. Accordingly, the untreated inorganic filler as indicated preferably is absent, or at least essentially absent, from the solution, and from the layer of the invention formed from the solution.

Also as a matter of particular preference with respect to the foregoing, there is no employment of the inorganic filler—again, particularly metal oxide filler—that is treated with coupling agent. Correspondingly—and here also, apart from the treated cocurative which may be employed—treated inorganic filler as indicated preferably is absent, or at least essentially absent, from the solution, and from the layer of the invention formed from the solution.

The foregoing 80 percent or greater acetate solutions of the invention provide coating preparations having excellent solution life, remaining coatable for up to 120 hours, or longer, after the curative has been added to the solution. Excellent solution life is maintained where no alcohol is used—although as indicated, MeOH is one of the solvents that can be employed with the one or more acetates. Further, coatings and layers prepared from these coating preparations are uniform and of high quality.

The combination or mixture that comprises solvent, fluoroelastomer composition, and nonfibrillatable and autoadhesive plastic particles, and that can further comprise one or more additional components as indicated, is subjected to mixing under high shear—i.e., to high shear mixing—to form the solution as discussed. This high shear mixing is mixing that breaks up all, or at least essentially all, physical aggregates of the nonfibrillatable and autoadhesive plastic particles that would be large enough to cause a coating defect—i.e., a defect in the layer that will be prepared from the coating composition being formed from this combination or mixture. An agglomerate that is at least 10 percent of the thickness of the final layer thickness is large enough to cause a defect as indicated. The shear is great enough, and maintained for long enough, to provide the indicated break up, and preferably also to achieve a homogeneous, or at least essentially homogeneous, or uniform, or at least essentially uniform, solution.

High shear mixing may be effected by solution milling, which comprises agitating an object or objects, such as milling media—e,g, ceramic or metallic milling media, such as spheres, beads, pellets, or cylindrical milling media—in the indicated combination or mixture; preferably this agitation is accomplished by moving the media through the combination or mixture. One means of effecting solution milling is by sealing the media and the combination or mixture in a cylindrical container, and rotating the container on its side, so that the media is continuously falling on itself.

High shear mixing also can be conducted by subjecting the combination or mixture to turbulent flow—e.g., the Reynold's number being at least about 2000. A high speed impeller can be employed to provide the requisite turbulence.

As still another method, the high shear mixing can be provided by ultrasonication.

High shear mixing facilitates incorporation of the nonfibrillatable and autoadhesive plastic particles into the solvent. A particular object of this mixing is ultimately to provide uniform, or at least essentially uniform, distribution of the particles in the layer of the invention.

It is both the use of high shear mixing, and the separate addition of the fluoroelastomer composition and the nonfibrillatable and autoadhesive plastic particles to the solvent, which together allow such an unexpectedly high proportion of the nonfibrillatable and autoadhesive plastic particles to be incorporated into the layer of the invention. The improved wear resistance, provided with the indicated solution blending of the plastic particles, is also unexpected.

In this regard, typical—e.g., inorganic—filler additives are dry compounded into the fluoroelastomer. This dry compounding is employed primarily because solution blending of these fillers tends to generate extremely poor layer qualities. The properties degraded by solution blending include coating uniformity, surface integrity, wear resistance, and resistance to cracking.

While the mechanism or mechanisms involved here are not fully understood, it is believed that the deleterious effects of solution blending occur because of the solvent's proclivity for interaction with the high surface energy filler, with this interaction repelling the fluoroelastomer from the filler. However, where the filler and fluoroelastomer are combined by dry compounding, there's nothing between them, and it is thought that the indicated dry compounding allows the fluoroelastomer to contact and adsorb onto filler surfaces; particularly, it is known that high molecular weight polymers, like fluoroelastomers, adsorb on surfaces, and can be difficult to desorb.

So when the resulting fluoroelastomer composition is dissolved in the solvent, the filler has already been contacted with the fluoroelastomer, and adsorbed thereto. And this adsorption is believed to inhibit the solvent's interaction with the filler, and thereby also to inhibit the indicated degradation; the adsorption yet further generates stronger fluoroelastomer/filler interactions once the solvent has evaporated.

However, in contrast with the high energy filler as discussed, the nonfibrillatable and autoadhesive plastic particles of the invention are characterized by low surface energy, and don't interact with the solvents. And particularly in the case of the fluoroplastic and fluororesin particles, and most especially the PTFE particles, of the invention, these particles have very low surface energy, and thus especially little affinity for the organic solvents, but rather are more chemically similar to the fluoroelastomer matrix.

So accordingly, the solvent does not interact with the plastic particles of the invention, to cause the degradation of properties as discussed. And with the fluoroplastic and fluororesin—and most especially the PTFE—particles in particular, where they are added directly to the solvent, the fluoroelastomer still interacts strongly with these particles. Therefore, the solution blending does not adversely affect the final layer produced from the coating preparation.

What is accordingly obtained, from the mixing under high shear, is a coating preparation or composition—preferably in the form of a solution—for providing a layer of the invention. With curative being present therein as indicated, it can be designated a curable composition.

Particularly for forming a fusing surface layer, the coating preparation may be applied to the fuser base in a succession of thin coatings, either as discrete layers or as a continuous buildup of layers. Application is by any suitable means, such as dipping, spraying, or transfer coating.

A method of dipping is ring coating. To conduct ring coating, the roller is drawn up through a larger diameter hole machined in two plates, a top plate and a bottom plate. Between the plates is a flexible gasket which forms a liquid tight seal with the roller surface and the top plate. The coating solution is poured into a well created by the roller, the flexible gasket, and the top plate. The roller is drawn up through the gasket and the solution coats the outside of the roller surface. In this manner a minimal amount of solution is used to coat each roller.

After it is applied, each coating is allowed to stand, at room temperature or higher, in order to flash off all or at least most of the solvent. For instance, following each application of a coating layer, evaporation of solvent is effected at temperatures of from about 25° C. to about 90° C. or higher.

When the desired thickness is obtained the resulting layer is cured. Preferably, the layer is heated to a temperature of from about 150° C. to about 250° C. and held for 12 to 48 hours. To prevent bubbling of the layer, either sufficient drying time is allowed for the indicated solvent flash off or evaporation to be completed, or the ramp to cure temperature—i.e., from room temperature to the stated 150° C.–250° C. upper limit—is extended over a period of 2 to 24 hours.

The number of coatings applied to form the fusing surface layer is that which will provide the appropriate thickness, which can be within a range as is conventional in the art. Specifically, the fusing surface layer can be of a thickness as is suitable for the systems and processes in which it is employed, and the requisite thickness for particular instances can be determined without undue experimentation.

Further as to fusing surface layer thickness, one factor to consider, with respect to the acceptable minimum thickness, is whether there is a cushion interposed between the fusing surface layer and fuser base. The presence of an intermediate compliant layer allows for stretching of the fusing surface layer during use. Accordingly, in addition to normal wear that is occurring, the delamination effect acting on the fusing surface layer is magnified. And the thicker the cushion interposed between fusing surface layer and base, the more this effect is magnified.

As to the foregoing, where the fusing surface layer of the invention resides right on the fuser base, then there is no deformability to magnify the delamination effect. In this instance, the fusing surface layer can be as thin as about 12 microns.

However, where there is a cushion layer or layers interposed between fusing surface layer and base, then if the total thickness of the intermediate compliant layer or layers is less than or equal to about 2500 microns, the surface layer should have a thickness of not less than about 25 microns. And if the total thickness of the intermediate compliant layer or layers is greater than about 2500 microns, then the fusing surface layer should be at least about 38 microns thick.

There are also factors to consider as to preferred maximum fusing surface layer thicknesses in various circumstances. For instance, if internal heating is employed in the fusing process, then the fusing surface layer must not be so thick as to impede heat transfer impermissibly, and thereby cause the base or core temperature to become excessive. Accordingly, even where the fusing surface layer is directly adjacent to the base, the layer preferably is not thicker than about 400 microns.

Where there is no internal heating, then the fusing surface layer can be thicker. In these circumstances the fusing surface layer can be as thick as about 1000 microns, or even thicker; theoretically there is no thickness upper limit, subject to considerations of cost and processing limitations.

However, with the fusing surface layer of the invention being provided by a solution coating method, such as the method discussed herein, then this factor is likely to put a practical upper limit on thickness. Because of the restricted amount of coating deposited by each application, then a point is reached where multiple iterations become operationally difficult. Accordingly, solution coating methods as are known generally limit the surface layer to a thickness of about 500 microns or less.

The fuser member of the invention can be used in toner fusing systems and processes where, during operation, release agent is applied to the fusing surface layer so that this agent contacts toner on the substrate, and can also contact the substrate, during the operation of the fuser member. Particularly where the fuser base is a cylindrical roller or an endless belt, the release agent is applied, while the base is rotating or the belt is running, upstream of the contact area between fuser member and substrate toner.

If employed, release agent preferably is applied so as to form a film on the fusing surface layer. As a matter of particular preference, the release agent is applied so as to form a film that completely, or at least essentially or at least substantially, covers the fusing surface layer. Also as a matter of preference, during operation of the system the release agent is applied continuously, or at least essentially or at least substantially continuously, to the fusing surface layer.

Release agents are intended to prohibit, or at least lessen, offset of toner from the substrate to the fusing surface layer. In performing this function, the release agent can form, or participate in the formation of, a barrier or film that releases the toner. Thereby the toner is inhibited in its contacting of, or even prevented from contacting, the actual fusing surface layer, or at least the fluoroelastomer thereof.

The release agent can be a fluid, such as an oil or a liquid, and is preferably an oil. It can be a solid or a liquid at ambient temperature, and a fluid at operating temperatures. Also as a matter of preference, the release agent is a polymeric release agent, and as a matter of particular preference, is a silicone or polyorganosiloxane oil.

Suitable release agents are those disclosed in U.S. Pat. Nos. 5,824,416, and 5,780,545. Also suitable are the polymers, molecular complexes, and compositions, including release agent compositions and treating compositions, disclosed in U.S. applications Ser. Nos. 10/454,897 and 10/454,900, both filed on Jun. 5, 2003. These two patents and these two applications are incorporated herein in their entireties, by reference thereto.

Further as to this matter, release agents which may be used include polymeric release agents having functional groups. Appropriate polymeric release agents with functional groups include those which may be found as liquids or solids at room temperature, but are fluid at operating temperatures.

Particular functional group polymeric release agents which may be used include those disclosed in U.S. Pat. Nos. 4,011,362, 4,046,795, and 5,781,840; these patents also are incorporated herein in their entireties, by reference thereto. Still further release agents which may be used are the mercapto functional polyorganosiloxanes disclosed in U.S. Pat. No. 4,029,827, and the polymeric release agents having functional groups such as carboxy, hydroxy, epoxy, amino, isocyanate, thioether, and mercapto functional groups, as disclosed in U.S. Pat. Nos. 4,101,686 and 4,185,140; yet additionally these patents are incorporated herein in their entireties, by reference thereto.

Preferred release agents with functional groups include the mercapto functional polyorganosiloxane release agents and the amino functional polyorganosiloxane release agents. Particularly preferred are the release agents, including mecapto functional polyorganosiloxane release agents, consisting of, consisting essentially of, consisting substantially of, or comprising monomercapto functional polyorganosiloxanes, or polyorganosiloxanes having one mercapto functional group per molecule or polymer chain. Also particularly preferred are release agents, including amino functional polyorganosiloxane release agents, consisting of, consisting essentially of, consisting substantially of, or comprising monoamino functional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties, by reference thereto.

Additional preferred release agents are the fluoro functional polyorganosiloxanes, including those with fluoroalkyl, such as trifluoroalkyl (e.g. trifluoropropyl) functionality, and fluorosilicones, and polyorganosiloxanes having fluorine-containing groups, as disclosed in U.S. Pat. Nos. 5,568,239, 5,627,000, and 5,641,603. These patents also are incorporated herein in their entireties, by reference thereto.

The fluoro functional polyorganosiloxanes are particularly preferred where the nonfibrillatable and autoadhesive plastic particles of the fusing surface layer comprise fluoroplastic and/or fluororesin particles, and especially PTFE particles. In this regard, the fluoro functional polyorganosiloxanes improve the wetting of the PTFE particles.

Further with regard to the functional agents, one point to consider is that because of their expense usually they are diluted with nonfunctional polyorganosiloxanes, particularly nonfunctional polydimethylsiloxanes. Another point is that for obtaining good release activity with a functional release agent, monofunctionality is preferred, so that the molecule cannot react both with toner and with the fusing surface layer, and thereby serve as a toner/fuser member adhesive. Therefore, the functional agent would ideally consist of entirely, or at least consist essentially, of the monofunctional moiety. However that also is impractical, also because of expense.

Therefore, the functional polyorganosiloxane preferably comprises as great a proportion of the monofunctional moiety as is practically possible. As a matter of particular preference, the functional polyorganosiloxane has a sufficient monofunctional proportion so as not to act as the indicated adhesive.

Accordingly, a preferred release agent composition comprises a blend of nonfunctional polyorganosiloxane, particularly nonfunctional polydimethylsiloxane, with amino functional polyorganosiloxane, and the amino functional polyorganosiloxane comprises monoamino functional polyorganosiloxane. Another preferred release agent composition comprises a blend of nonfunctional polyorganosiloxane, particularly nonfunctional polydimethylsiloxane, with mercapto functional polyorganosiloxane, and the mercapto functional polyorganosiloxane comprises monomercapto functional polyorganosiloxane.

The release agent may be applied to the fuser member by any suitable applicator, including sump and delivery roller, jet sprayer, etc. Those means as disclosed in U.S. Pat. Nos. 5,017,432 and 4,257,699 may be employed; the latter of these two patents is incorporated herein in its entirety, by reference thereto. Preferably the present invention employs a rotating wick oiler or a donor roller oiler.

A rotating wick oiler comprises a storage compartment for the release agent and a wick for extending into this compartment. During operation of the toner fusing system of the invention, the wick is situated so as to be in contact with the stored release agent and also with the fusing surface layer of the fuser member; the wick thusly picks up release agent and transfers it to the fuser member.

A donor roller oiler includes two rollers and a metering blade, which can be a rubber, plastic, or metal blade. One roller meters the oil in conjunction with the blade, and the other transfers the oil to the fuser roller. This type of oiler is common in the art, and is frequently used with fuser members having fluoroelastomer fusing surface layers.

The release agent is applied to the substrate, particularly in the case of paper, preferably at a rate of from about 0.1 to about 20 microliters, more preferably at a rate of about 1.0 to about 8 microliters, per 8½" by 11" copy. The applicator accordingly is adjusted to apply the release agent at this rate.

A toner fusing system of the invention is shown in FIG. 1. Multilayered fuser roller 10 comprises, in sequential order, a fuser base 11, in the form of a hollow cylindrical roller, as well as a cushion layer 12 and a fusing surface layer 13. Fusing surface layer 13 has nonfibrillatable and autoadhesive PTFE particles (not depicted in FIG. 1) dispersed therein. Internal heating member 14, an optional element in the invention, is disposed in the hollow portion of fuser base 11.

External heating members 15 and 16 are in the form of hollow cylindrical rollers; their rotational directions, and the rotational directions of all the other rotating elements, is shown by their respective arrows. The rotational directions as depicted can all be reversed.

External heating members 15 and 16 are heated by respective heating lamps 17. These two contact heating members are spaced apart by a distance less than the diameter of fuser member 10, which is in contact with both. Contact heating members 15 and 16 transfer heat to fuser member 10 by their contact with fusing surface layer 13.

Rotating wick oiler 18 applies release agent to fusing surface layer 13.

Support member 19, in the form of a backup roller, cooperates with fuser member 10 to form fusing nip or contact arc 20. Copy paper or other substrate 21, carrying unfused toner images 22, passes through fusing nip 20 so that toner images 22 are contacted by fusing surface layer 13. Support member 19 and fuser member 10 act together to apply pressure to the paper 21 and toner 22, and fuser member 10 also provides heat, with the heat and pressure serving to fuse toner 22 to the paper 21.

Dispensing roller 26 incrementally feeds cleaning web 24 over advance roller 25, to be rolled up onto collecting roller 23. In passing along roller 25, web 24 contacts and cleans contact heating members 15 and 16.

Cleaning web 24 is a polyamide material. A polyamide web which may be employed for this purpose is commercially available under the trademark Nomex® from BMP of America, Medina, N.Y. Any other suitable cleaning material may be employed instead.

In place of the indicated cleaning assembly, any other means or apparatus appropriate for cleaning the contact heating members may be employed. Alternatively, the contact heating members can be provided with a nonstick coating. This coating can be a fluoroplastic, and it can include a heat conducting filler. Where the contact heating members have a nonstick coating the means for cleaning these members can be omitted.

Figure 2:
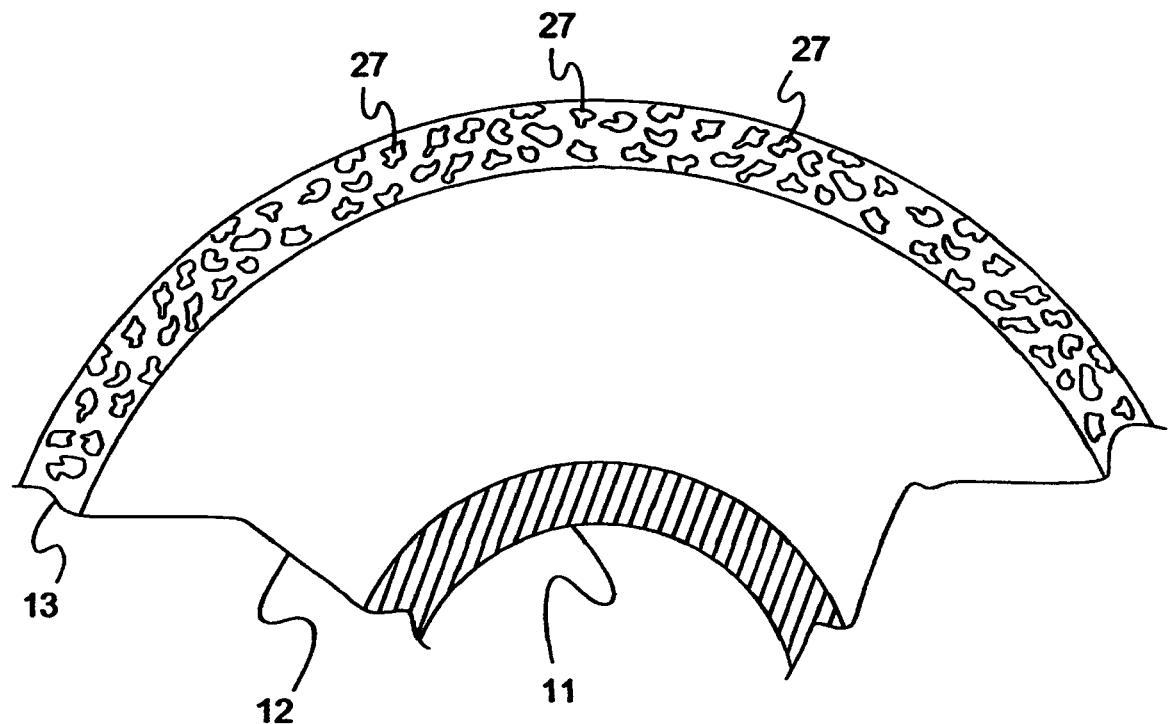
FIG. 2 is a schematic representation, and an enlarged fragmentary sectional view, of an embodiment of the fuser member of the invention.
Figure 3:
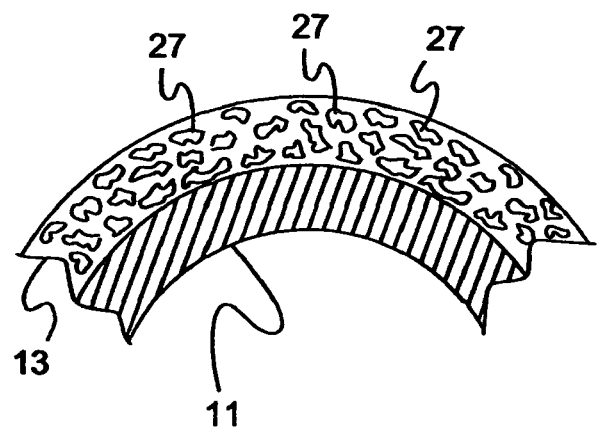
FIG. 3 is a schematic representation, and an enlarged fragmentary sectional view, of another embodiment of the fuser member of the invention.

FIG. 2 shows a fragmentary view of an embodiment of fuser member 10, magnified to show the multiple layers in greater detail. Nonfibrillatable and autoadhesive PTFE particles 27 are distributed through fusing surface layer 13. FIG. 3 shows a fragmentary view of another embodiment of fuser member 10, also magnified to show greater detail. In this embodiment there is no cushion, and fusing surface layer 13 resides directly on fuser base 11.

The invention is illustrated by the following procedures; these are provided for the purpose of representation, and are not to be construed as limiting the scope of the invention. Unless stated otherwise, all percentages, parts, etc. are by weight.

EXPERIMENTAL PROCEDURES

Materials Employed in the Procedures

Viton® A fluoroelastomer, a copolymer of vinylidene fluoride and hexafluoropropylene Viton® GF fluoroelastomer, a terpolymer of vinylidene fluoride, hexafluoropropylene, and tetrafluoroethylene $Fe_2O_3$ (2199 and 7098), approx. 0.27 microns mean particle diameter and approx. 0.7 microns mean particle diameter, respectively, from Harcros Pigments Inc., Easton, Pa.

$Al_2O_3$ (AL601 and AL602), approx. 12 microns mean particle diameter and approx. 20 microns mean particle diameter, respectively, from Atlantic Equipment Engineers, Bergenfield, N.J.

Carbon black (Thermax), from R.T. Vanderbilt Company Inc., Norwalk, Conn.

PTFE (M-270), approx. 50 microns mean particle diameter, from Shamrock Technologies Inc., Newark, N.J.

PTFE (MP1100), approximately 0.2 microns mean particle diameter, from DuPont Fluoroproducts, Wilmington, Del.

Dow™ 1200 RTV Prime Coat primer, from Dow Corning Corporation, Midland, Mich. A metal alkoxide type primer containing light aliphatic petroleum naptha (85 weight percent), tetra (2-methoxy-ethoxy) silane (5 weight percent), tetrapropyl orthosilicate (5 weight percent), and tetrabutyl titanate (5 weight percent)

Silastic™-J 60 Shore A addition cure RTV silicone rubber, from Dow Corning Corporation EC4952 65 Shore A condensation cure RTV silicone rubber, from Emerson & Cuming ICI, Billerica, Mass.

PS513 α,ω 3-aminopropyldimethylsiloxy terminated polydimethylsiloxane, from United Chemical Technologies, Inc., Bristol, Pa.

60,000 centistoke DC200 polydimethylsiloxane, from Dow Corning Corporation

MgO (Maglite™-Y), from Merck/Calgon Corp., Teterboro, N.J.

Viton® Curative No. 50, from Dupont Dow Elastomers

Catalyst 50, from Emerson & Cuming ICI

SFR-100 silicone, from GE Silicones, Waterford, N.Y.

Preformed particulate silicone rubber powders: KMP597, approx. 5 microns mean particle diameter; KMP598, approx. 13 microns mean particle diameter; 52-854, approx. 0.8 microns mean particle diameter; X-52-875, approx. 40 microns mean particle diameter. Surface treated core-shell configuration preformed particulate silicone rubber powder: KMP600, approx. 5 microns mean particle diameter. From Shin-Etsu Silicones of America, Inc., Akron, Ohio Cylindrical ceramic milling media, from US Stoneware, East Palestine, Pa.

Preparation of Fluoroelastomer Compositions

Viton® A, Viton® GF, and MgO, in amounts as set forth in Table 1, and filler, of the types and in the amounts as also identified in Table 1, were thoroughly compounded on a water cooled two roll mill at 63° F. (17° C.). For each composition, compounding was conducted until a uniform, dry composite sheet was obtained. The sheet was removed and stored until used for the preparation of a coating solution.

TABLE 1

| Composition No. | Fluoroelastomer (type) | (grams) | MgO (grams) | Filler (type) | (grams) | PTFE (MP1100) (grams) |
|---|---|---|---|---|---|---|
| 1 | Viton ® A | 300 | 36 | $Fe_2O_3$ (7098) | 498 | 0 |
|   |            |     |    | Carbon Black     | 3   |   |
| 2 | Viton ® A | 300 | 36 | $Fe_2O_3$ (7098) | 357 | 60 |
| 3 | Viton ® A | 300 | 36 | $Fe_2O_3$ (7098) | 498 | 45 |
| 4 | Viton ® A | 300 | 36 | $Fe_2O_3$ (7098) | 420 | 30 |
| 5 | Viton ® A | 300 | 36 | $Fe_2O_3$ (7098) | 465 | 15 |
| 6 | Viton ® A | 300 | 36 | $Fe_2O_3$ (7098) | 309 | 0 |
| 7 | Viton ® A | 300 | 36 | $Fe_2O_3$ (2199) | 109 | 0 |
| 8 | Viton ® A | 300 | 36 | $Fe_2O_3$ (2199) | 396 | 0 |
| 9 | Viton ® A | 300 | 36 | None |  | 0 |
| 10 | Viton ® GF | 300 | 36 | None |  | 0 |
| 11 | Viton ® A | 500 | 60 | Carbon Black | 5 | 0 |
| 12 | Viton ® A | 300 | 36 | $Al_2O_3$ (601) | 174.9 | 0 |
| 13 | Viton ® A | 300 | 36 | $Al_2O_3$ (602) | 174.9 | 0 |

EXAMPLES 1–3

For Examples 1–3, Compositions 2–4, respectively, were each divided into pieces, and, along with MEK, placed in a ceramic crock with about 25 cylindrical ceramic milling media. The crock had an outer diameter of 75 mm; each of the cylindrical ceramic milling media had a diameter of about 12 mm, and a length of about 12 mm.

The ceramic crock was sealed, and placed on its side on the indicated roll mill. Mixing under high shear was conducted by rotating the sealed crock at a velocity of 9–10 cm/sec, for a period of 18–26 hours.

Further as to Examples 1–3, for each of these Examples, the fluoroelastomer composition included 10 grams or more MP1100 PTFE per 100 grams of Viton® A fluoroelastomer (i.e., plastic particles comprising 10 percent by weight or more of the elastomer). And in all of these Examples, the fluoroelastomer composition failed to dissolve, instead forming flakes dispersed in the MEK solvent.

EXAMPLE 4

65 grams of Composition 5 were divided into pieces, and dissolved in 107.3 grams of MEK, in a ceramic crock with cylindrical ceramic milling media, as employed with Examples 1–3. Solution milling was conducted in the same manner as with Examples 1–3, for a period of 18 hours. The resulting solution appeared to be substantially uniform.

From the results obtained in Examples 1–4, it appears that where the PTFE is provided to the solvent as part of the fluoroelastomer composition, a coatable solution can only be obtained when the plastic is about 5 percent or less by weight of the elastomer.

EXAMPLE 5

35 grams of Composition 1 were divided into pieces, and dissolved in 65.5 grams of MEK, in a ceramic crock with cylindrical ceramic milling media, as employed with Examples 1–3. Solution milling was conducted in the same manner as with Examples 1–3. After 7 hours of milling, 1.8865 grams of MP1100 PTFE (15 percent by weight of the elastomer) was added to the solution, and milling was continued for an additional 18 hours. 0.45 grams of PS513 and 0.82 grams of Viton® Curative No. 50 were added to the solution, which was filtered with a medium paint filter, and degassed for 1 minute under 25 mm Hg vacuum.

A fuser roller from an Imagesource 110 electrostatographic copier, from Heidelberg Digital L.L.C., Rochester, N.Y., was wiped with isopropyl alcohol, then corona discharge treated for 1 minute at 300 watts, to prepare for coating the above indicated fluoroelastomer solution thereon. 30 minutes after addition of the PS513 and the Viton® Curative No. 50, the solution was ring-coated twice onto the corona discharge and isopropyl alcohol treated fuser roller, with the solvent being allowed to flash off.

The result was a defect free coating. The thusly-coated roller was cured by ramping the temperature from room temperature to 230° C. over a 12 hour period, and then holding the temperature at 230° C. for 24 hours.

EXAMPLE 6

A fuser roller was prepared in substantially the same manner as that of Example 5, except with Composition 6 being used in place of Composition 1, and with 3.255 grams of MP1100 PTFE (20 percent by weight of the fluoroelastomer) instead of 1.8865 grams.

The foregoing results demonstrate that by employing the high shear of solution milling, and adding the PTFE to the solvent separately from the fluoroelastomer composition, a defect free coating can be produced using the nonfibrillatable PTFE of the invention. Although traditional methods of mechanical incorporation are used to provide rubber compositions with as much as about 20 to about 30 weight percent PTFE, these methods only allow a small fraction of PTFE to be incorporated when solution coating methods are desired, even when high shear solution milling is employed.

Determination of Optimal PTFE Level for Wear Resistance, in Comparison with Metal Oxide Filled Materials The fuser roles of Examples 7–18 were prepared using the materials identified in Table 2, in the amounts as set forth therein, according to the following procedures.

EXAMPLES 7–9

For each of Examples 7–9, the Composition was divided into pieces, and placed in a glass jar with the MEK, to dissolve the Composition in the MEK. The jar was sealed, placed on it side on the previously discussed two roll mill, and rotated to effect gentle stirring.

The PS513 and Viton® Curative No. 50 were added subsequently. To make this addition, the jar was taken off the roll mill, unsealed, addition was effected, the jar was again placed on its side on the mill, and rotation to provide gentle stirring was resumed. This stirring was continued until the solution was filtered and degassed, in the same manner as these steps were conducted in Example 5.

An Imagesource 110 fuser roller was prepared in the same manner as that of Example 5. 30 minutes after addition of the PS513 and the Viton® Curative No. 50, ring-coating and curing was effected, also in the same manner as that of Example 5.

EXAMPLES 10–18

The fuser rollers of Examples 10–16 were prepared in the same manner as that of Example 5.

Testing Fuser Members of Examples 7–18 for Rate of Surface Wear

For each of the fuser rollers of Examples 7–18, a 1 inch wide axial section was cut from the roller, then trimmed to a strip 0.59 inches wide by 0.088 inches thick for surface abrasion testing. The sample was placed on a heated stage, and maintained at 175° C. during the test.

Surface abrasion was performed using a Norman Abrasion Wear Tester, Norman Tool, Inc., Evansville, Ind., with a 0.69 inches wide strip of test paper for wearing the sample. The test paper was pressed in contact with the sample, and cyclically dragged over the sample under a 755 gram load, for multiple wear cycles, thereby producing abrasive wear in the form of a wear track.

The depth of the wear track was measured with a Surfanalyzer® System 4000, from Mahr Federal Inc., Providence, R.I., using a conical stylus under a 250 mg load. The wear rate was calculated in mils of wear track depth per 100 cycles, and the results are shown in Table 2.

TABLE 2

| Ex. No. | Comp. No. | Comp. (amt.) (grams) | PTFE (type) | PTFE (size) (μm) | PTFE (amt.) (grams) | PS513 (grams) | Vol. % Filler | MEK (grams) | Viton ® Curative No. 50 (grams) | Wear Rate (mils/100 cycles) |
|---|---|---|---|---|---|---|---|---|---|---|
| 7 | 7 | 35 | None | | | 0.45 | 25% | 65 | 1.3895 | 0.69 |
| 8 | 8 | 21 | None | | | 0.22 | 30% | 39 | 0.76 | 1.12 |
| 9 | 1 | 40 | None | | | 0.41 | 35% | 60 | 0.83 | 1.86 |
| 10 | 9 | 20 | MP1100 | 0.2 | 4.2 | 0.5 | 14% | 80 | 1.16 | 0.34 |
| 11 | 9 | 20 | MP1100 | 0.2 | 13.2 | 0.5 | 33% | 80 | 2.5 | 0.14 |

TABLE 2-continued

| Ex. No. | Comp. No. | Comp. (amt.) (grams) | PTFE (type) | PTFE (size) (μm) | PTFE (amt.) (grams) | PS513 (grams) | Vol. % Filler | MEK (grams) | Viton® Curative No. 50 (grams) | Wear Rate (mils/100 cycles) |
|---|---|---|---|---|---|---|---|---|---|---|
| 12 | 9 | 20 | MP1100 | 0.2 | 20 | 0.5 | 43% | 84 | 2.5 | 0.1 |
| 13 | 9 | 20 | MP1100 | 0.2 | 30 | 0.5 | 53% | 95 | 2.5 | 0.09 |
| 14 | 9 | 20 | MP1100 | 0.2 | 40 | 0.5 | 60% | 105 | 2.5 | 0.13 |
| 15 | 10 | 20 | MP1100 | 0.2 | 30 | 0.5 | 53% | 95 | 2.5 | 0.08 |
| 16 | 10 | 20 | MP1100 | 0.2 | 40 | 0.5 | 60% | 95 | 2.5 | 0.12 |
| 17 | 9 | 20 | M-270 | 50 | 4.2 | 0.5 | 14% | 80 | 2.5 | 1.19 |
| 18 | 9 | 20 | M-270 | 50 | 13.2 | 0.5 | 33% | 80 | 2.5 | 0.3 |

The data set forth in Table 2 demonstrate the surprising result that wear rate improved as the PTFE level was increased to the range of 43 to 60 volume percent (40 to 66 weight percent). The improvement in wear at extraordinarily high filler levels was maintained, even for 50 micron PTFE particles. In comparison, as also can be seen from the Table 2 data, even at low levels (25 to 30 volume percent), traditional inorganic fillers show increasing wear rate as the proportion of filler is increased.

The indicated extraordinarily high filler levels cannot be obtained using traditional milling techniques. The maximum levels normally recommended in the art are about, 15 to 20 volume percent (15 to 20 weight percent).

Solution Life

EXAMPLES 19–20

For each of Examples 19 and 20, 8 grams of Composition 9 was divided into pieces, and placed in a glass cylinder along with 7.14 grams of MP1100 PTFE and 72 grams of MEK (Example 19) or ethyl acetate (Example 20) solvent, as identified in Table 3. Once the fluoroelastomer composition and plastic particles were dissolved, about 0.16 grams of Viton® Curative No. 50 and 0.13 grams of PS513 were added. Milling of the resulting solution was conducted in the same manner as with Examples 7–9, with the solution being measured periodically until viscosity exceeded 500 cp.

EXAMPLE 21

A solution was prepared and evaluated in substantially the same manner as those of Examples 19 and 20, except for the following differences. 3.1 grams of methanol was added to 25 grams of the solution (comprising 20.7 grams of solvent); further, it was this portion to which the curative and PS513 were subsequently added, and with which the solution milling and viscosity measurement were conducted.

For all of Examples 19–21, the period of time from the addition of curative until the viscosity of over 500 cp was reached is the solution pot life. The values for this parameter also are listed in Table 3.

TABLE 3

| Example No. | Solvent | MeOH (% by wt. of EtAc) | Starting viscosity (at 2 hrs.) | Pot Life (hrs.) |
|---|---|---|---|---|
| 19 | MEK | — | 75 | 18 |
| 20 | Ethyl acetate | — | 53 | 92 |
| 21 | Ethyl acetate | 15% | 33 | >241 |

EXAMPLE 22

120 grams of Composition 9 were divided into pieces, and dissolved in 561 grams of ethyl acetate, in a ceramic crock with cylindrical ceramic milling media. 107.16 grams pf MP1100 PTFE was added, and solution milling was conducted in the same manner as with Examples 1–3, for a period of 18 hours. 2.217 grams of Viton® Curative No. 50 was added to the solution, which was filtered with a medium paint filter, and degassed for 1 minute under 25 mm Hg vacuum.

An Imagesource 110 fuser roller was prepared in the same manner as that of Example 5, and ring-coated with the solution at 1, 24, and 48 hours after addition of the curative. The thusly-coated roller was cured by ramping the temperature from room temperature to 230° C. over a 12 hour period, and then holding the temperature at 230° C. for 24 hours.

Wear rate was determined using the procedures as previously discussed, and found to be 0.08 mils per 100 cycles.

EXAMPLE 23

A fuser roller was prepared and evaluated in substantially the same manner as that of Example 22, except for the following differences. After the solution milling, 25.09 grams of methanol was added to 235 grams of the solution (comprising 167.3 grams of solvent); further, it was this portion to which the curative was added, and with which the ring-coating was conducted.

The wear rate was found to be 0.09 mils per 100 cycles.

As to the above Examples, the coatings prepared using ethyl acetate solvent, with or without methanol, showed excellent pot life, maintained excellent wear properties, and proved to be comparable to the coatings prepared with MEK (e.g., Example 12). Inorganic fillers used in combination with acetates and alcohols show degradation of the wear properties.

Comparison of Polydimethylsiloxane Filled Fusing Surface Layers, with and without PTFE Particles

EXAMPLE 24

9 grams of Composition 10 were divided into pieces, and dissolved in 50 grams of ethyl acetate, along with 8 grams of MP1100 PTFE and 4 grams of KMP600 silicone rubber particulate. The resulting solution was added to a ceramic crock with cylindrical ceramic milling media, and solution milling was conducted in the same manner as with Examples 1–3, for a period of 12 hours. 0.35 grams of PS513 and 0.55 grams of Viton® Curative No. 50 were added to the solution, resulting in a solution viscosity of 190 cp. The solution was filtered with a medium paint filter, and degassed for 1 minute under 25 mm Hg vacuum.

An Imagesource 110 fuser roller was prepared in the same manner as that of Example 5. 30 minutes after addition of the PS513 and the Viton® Curative No. 50, ring-coating and curing were effected, also in the same manner as that of Example 5.

EXAMPLE 25

A fuser roller was prepared in substantially the same manner as that of Example 24, except with 11.2 grams of Composition 9 in place of Composition 10, and with 80 grams of ethyl acetate, 10 grams of MP1100 PTFE, and 5 grams of KMP600 silicone rubber particulate, 0.53 grams of PS513, and 0.7 grams of Viton® Curative No. 50, instead of the amounts specified in Example 24. Here, the solution viscosity was 190 cp was obtained.

EXAMPLE 26

A fuser roller was prepared in substantially the same manner as that of Example 25, except with 5 grams of KMP597 silicone rubber particulate in place of the KMP600 particulate, and with 54 grams of ethyl acetate and 0.4 grams of PS513, instead of the amounts specified in Example 25. Here, the solution viscosity was 225 cp.

EXAMPLE 27

A fuser roller was prepared in substantially the same manner as that of Example 26, except with 5 grams of KMP598 silicone rubber particulate in place of the KMP597 particulate. Here, the solution viscosity was 240 cp.

EXAMPLE 28

A fuser roller was prepared in substantially the same manner as that of Example 26, except with 5 grams of 52-854 silicone rubber particulate in place of the KMP597 particulate. Here, the solution viscosity was 275 cp.

EXAMPLE 29

20 grams of Composition 9 were divided into pieces, and dissolved in 90 grams of MEK, along with 20 grams of MP1100 PTFE and 1 gram of PS513, in a ceramic crock with cylindrical ceramic milling media. Solution milling was conducted in the same manner as with Examples 1–3. After 18 hours of milling, 10 grams of SFR-100 were added to the solution, and milling was continued for an additional 6 hours. 0.97 grams of Viton® Curative No. 50 were added to the solution, which was filtered and degassed, in the same manner as these steps were conducted in Example 24.

An Imagesource 110 fuser roller was prepared, also in the same manner as that of Example 24. 30 minutes after addition of the Viton® Curative No. 50, ring-coating and curing was effected, here again in the same manner as that of Example 24.

EXAMPLE 30

A fuser roller was prepared in substantially the same manner as that of Example 24, except without the MP1100 PTFE, with 14 grams of Composition 9 in place of Composition 10, and with 60 grams of ethyl acetate, 6.25 grams of KMP600 silicone rubber particulate, 0.4 grams of PS513, and 0.86 grams of Viton® Curative No. 50, instead of the amounts specified in Example 24. Here, the solution viscosity was 150 cp was obtained.

EXAMPLE 31

A fuser roller was prepared in substantially the same manner as that of Example 30, except with 6.25 grams of KMP597 silicone rubber particulate in place of the KMP600 particulate. Here, the solution viscosity was 190 cp.

EXAMPLE 32

A fuser roller was prepared in substantially the same manner as that of Example 30, except with 6.25 grams of KMP598 silicone rubber particulate in place of the KMP600 particulate. Here also the solution viscosity was 190 cp.

EXAMPLE 33

A fuser roller was prepared in substantially the same manner as that of Example 30, except with 6.25 grams of 52-854 silicone rubber particulate in place of the KMP600 particulate. Yet again the solution viscosity was 190 cp.

Wear rate was measured in the same manner at that employed with Examples 7–18. The surface roughness of the wear track was measured in microinches ($\mu$inches), using the indicated Surfanalyzer® System 4000 with the same tip and load, by running the tip along the valley of the wear track. The results obtained from these measurements are set forth in Table 4.

TABLE 4

| Example No. | Silicone particulate | | PTFE (pph) | Wear track Surface Roughness ($\mu$inches) | Wear Rate (mils/100 cycles) |
| --- | --- | --- | --- | --- | --- |
| | (type) | (size) ($\mu$m) | | | |
| 24 | KMP600 | 5 | 100 | 73 | 0.16 |
| 25 | KMP600 | 5 | 100 | 94 | 0.21 |
| 26 | KMP597 | 5 | 100 | 131 | 0.18 |
| 27 | KMP598 | 13 | 100 | 163 | 0.23 |
| 28 | 52-854 | 0.8 | 100 | 90 | 0.20 |
| 29 | SFR-100 | Liquid | 100 | 86 | 0.63 |
| 30 | KMP600 | 5 | 0 | 75 | 4.36 |
| 31 | KMP597 | 5 | 0 | 146 | 7.2 |
| 32 | KMP598 | 13 | 0 | 280 | 36.67 |
| 33 | 52-854 | 0.8 | 0 | 82 | 2.13 |

The foregoing values demonstrate that the surface roughness of the wear track, which is the equilibrium roughness of the fusing surface layer, can be controlled by varying the size and hardness of the silicone particulate. Also as can be seen, generally the equilibrium surface roughness becomes greater as larger silicone particles are employed; this relationship is useful for controlling image gloss.

Further, the fluoroelastomer fusing surface layers with both preformed silicone particulate fillers and autoadhesive and nonfibrillatable PTFE particles (Examples 24–28) had significantly reduced wear, as compared to similar layers where the PTFE particles were absent (Examples 30–33). And with the fusing surface layer instead having domains from curable siloxane polymer in combination with the PTFE (Example 29), the wear rate obtained was still much superior to what resulted with the layers not having autoadhesive and nonfibrillatable PTFE particles.

In those of the layers without the PTFE particles, wear rates worsened as the size of the preformed silicone particles was increased; accordingly, in the absence of the PTFE, bringing about increased equilibrium surface roughness entailed the sacrifice of wear resistance. In contrast, the corresponding layers also containing autoadhesive and nonfibrillatable PTFE particles showed no dependence on size with respect to wear, and allowed for greater equilibrium surface roughness to be provided without the rate of wear being increased.

It is particularly surprising that the extremely high wear occurring with the presence of large preformed silicone particles (Example 32) was completely absent with the corresponding layer that included the autoadhesive and nonfibrillatable PTFE particles along with the silicone particulate (Example 27). The specified difference demonstrates that the presence of the PTFE particles kept the greater wear from occurring. This discovery provides the novel advantage of allowing for the incorporation of large preformed silicone particles without the wear properties being sacrificed.

The data of Table 4 also demonstrate that the advantage in wear rate, obtained with using the combination of preformed silicone particulate fillers and autoadhesive and nonfibrillatable PTFE particles, is achieved with different fluoroelastomers, and also with surface-treated (or core-shell) preformed silicone particles. Yet additionally, it is apparent that preformed silicone particles, used with the PTFE, provide better wear properties than are obtained where the domains employed in this combination instead are formed from curable silicone elastomers, particularly curable siloxane polymers, or crosslinkable liquid silicone— although, as noted, good results still are obtained with the latter, particularly as compared with the layers lacking PTFE.

It is accordingly established that if the autoadhesive and nonfibrillatable PTFE particles of the invention are employed together with the preformed silicone particles, then progressively larger silicone filler can be used, to obtain correspondingly increased roughness, while maintaining a favorable wear rate. Accordingly, the invention allows for superb wear properties to be maintained, independent of the surface roughness, thus allowing control of image quality without sacrificing part life.

Preparation of Fuser Members for Examples 34–38

EXAMPLE 34

A cylindrical stainless steel fuser core was cleaned with dichloromethane and dried. The core was then primed with a uniform coat of Dow™ 1200 RTV Prime Coat primer. Silastic™-J silicone rubber, parts A and B, were then mixed, injection molded onto the core, and cured at 232° C. for 2 hours under 75 tons/inch$^2$ of pressure.

The roller was then removed from the mold and baked in a convection oven with a temperature ramp increasing to 232° C. substantially uniformly over 24 hours, and this temperature then being maintained for an additional 24 hours. After air cooling, EC4952 silicone rubber was blade coated directly onto the Silastic™-J silicone rubber layer, then cured for 12 hours at about 210° C., followed by 48 hours at 218° C. in a convection oven. After air cooling, the EC4952 silicone layer was ground to a thickness of 0.457 mm (0.018 inches), and the thusly layered fuser core was corona discharge treated for 1 minute at 300 watts.

The resulting product was a fuser core with a cushion made up of a Silastic™-J silicone layer having a thickness of 4.572 mm (0.180 inches), overlaid by an EC4952 silicone layer having the thickness as indicated. To prepare for coating the fluoroelastomer fusing surface layer thereon, the cushion was wiped with isopropyl alcohol.

A fluoroelastomer solution was prepared in substantially the same manner as those of Examples 7–9, with 17.3 grams of Composition 11, 72.85 grams of MEK, 0.4 grams of PS513 and 1.47 grams of Viton® Curative No. 50. 30 minutes after addition of the PS513 and the Viton® Curative No. 50, the fluoroelastomer solution was ring-coated onto the corona discharge and isopropyl alcohol treated roller thrice, allowing the coating to dry between coats. The thusly-coated roller was cured by ramping the temperature from room temperature to 230° C. over a 12 hour period, and then holding the temperature at 230° C. for 24 hours.

The thickness of the fluoroelastomer coating was measured by removing a small portion of the roller surface and measuring the layer thickness by optical microscopy. By this method, the coating was determined to be 2.56 mils thick.

EXAMPLE 35

A fuser roller was prepared in substantially the same manner as that of Example 34, except with 30 grams of Composition 12 in place of Composition 11, and with 60 grams of MEK and 1.23 grams of Viton® Curative No. 50, instead of the amounts specified in Example 34; as in Example 34, 0.4 grams of PS513 was also used here. The thickness of the fluoroelastomer coating was measured by the same manner as in Example 34, and determined to be 4.45 mils thick.

EXAMPLE 36

A fuser roller was prepared in substantially the same manner as that of Example 35, except with 15 grams of Composition 13 in place of Composition 11. The thickness of the fluoroelastomer coating was measured by the same manner as in Example 35, and determined to be 3.95 mils thick.

EXAMPLE 37

A fuser roller core with a cushion was prepared in substantially the same manner as that of Example 34. For the preparation of a fluoroelastomer solution, 50 grams of Composition 11 were divided into pieces and dissolved in 122 grams of MEK, along with 30 grams of M-270 PTFE particles, in a ceramic crock with cylinderical milling media. Solution milling was conducted in the same manner as with Examples 1–3, for a period of 18 hours. 1.0 grams of PS513 and 3.1 grams of Viton® Curative No. 50 were added to the solution, which was filtered with a medium paint filter, and degassed for 1 minute under 25 mm Hg vacuum.

30 minutes after addition of the PS513 and the Viton® Curative No. 50, the fluoroelastomer solution was ring-coated onto the corona discharge and isopropyl alcohol treated roller thrice, allowing the coating to dry between coats. The thusly-coated roller was cured by ramping the temperature from room temperature to 230° C. over a 12 hour period, and then holding the temperature at 230° C. for 24 hours. The thickness of the fluoroelastomer coating was measured by the same manner as in Example 34, and determined to be 3.4 mils thick.

EXAMPLE 38

A fuser roller was prepared in substantially the same manner as that of Example 37, except with 125 grams of MEK, 15 grams of M-270 PTFE particles, and 0.86 grams of PS513, instead of the amounts specified in Example 37. The thickness of the fluoroelastomer coating was measured by the same manner as in Example 37, and determined to be 2.7 mils thick.

Testing Fuser Members of Examples 34–38 for Gloss Level and Toner Contamination

To compare the respective performances of the fuser rollers of the Examples 34–38, these rollers were each employed with a Heidelberg Digimaster™ 9110 (HD9110) electrophotographic fusing system. In every instance unfused toner was applied to a paper substrate in the HD9110 system, with the roller being employed in the fixing of the toner to the paper.

The release oil of the HD9110 fuser was changed from the standard 60,000 cSt release fluid to a blend of 87.5 weight percent DC200 and 12.5 weight percent of an α-3-aminopropyldimethylsiloxy, ω-trimethylsiloxy terminated polydimethylsiloxane with a number average molecular weight of 12,000. The rate of application was 2.0 milligrams per copy. The fuser set point temperature was increased by 30° F. for the fuser members of Examples 37 and 38. Otherwise, all materials, hardware and set points used to compare the indicated fuser rollers were consistent with the Heidelberg Digimaster™ 9110 system.

Each roller was placed in the fuser, and the HD9110 system was run with standard 20# bond paper using a variety of toned images. At print count measurements of about 10,000, about 200,000, and about 300,000, special short runs were employed for conducting gloss level and toner contamination tests; in this regard, the tests at about 10,000 prints actually were conducted between 0 prints and 10,000 prints, while the tests at about 200,000 prints and at about 300,000 prints were conducted within about 20,000 prints of the count—i.e., between about 180,000 and about 220,000 prints, and between about 280,000 and about 320,000 prints, respectively.

The fuser rollers of Examples 34–38 were tested for gloss level of the generated image, and also for toner contamination.

1. Gloss Level

Gloss was measured in terms of gloss number, which is determined using a BYK-Gardner (GB-4520 micro-trigloss) meter at an angle of 85 degrees from the vertical on a solid toned area. The gloss meter reading is the percentage of white light reflected from a test sample relative to a black glass standard with a refractive index of about 1.567 (This measurement conforms to ASTM D 523 Standard Test Method for Specular Gloss). At 85 degrees, about 99 percent of incident light is reflected by the black glass standard so the gloss number is approximately equal to the percentage of reflected light. A solid toned area is defined as having a reflection density equal to or greater than 1.0 using an X-Rite 404 Reflection Densitometer, from X-Rite Company, Grand Rapids, Mich. For conducting the indicated measurements, 20# bond paper, as noted, was employed; however, with these procedures, similar results would still be obtained using smoother papers.

2. Toner Contamination

Fuser roller contamination rate was measured at the indicated 200,000 print level. The special short run for this purpose was 2500 prints. After this print run, toner offset to the cleaning web of the Digimaster™ 9110 system was measured to determine contamination.

As to collection of toner on the cleaning web surface, in the Digimaster™ 9110 system the fuser roller is heated by contact with two external aluminum heater rollers that are heated by internal lamps. Toner offset from the paper is removed from the fuser roller by the heater rollers, by virtue of the high surface energy of the anodized aluminum surface of the heater rollers. A thin Nomex® cleaning web is used to remove toner offset from the heater rollers by contact with both. The configuration of the indicated system elements is that as shown in FIG. 1.

Contamination of the cleaning web was determined by measuring and averaging the optical transmission density of toner collected on the cleaning web surface. Optical transmission density was measured using an X-Rite 310 Transmission Densitometer, from X-Rite Company.

The density of the toner offset collected by the cleaning web estimates the offset rate of the fuser. As discussed herein, this offset acts as contamination, and accordingly offset rate indicates the degree of contamination. Therefore, the density of this offset on the web is a measure of the degree of contamination.

Clean webs were used to set the measured optical transmission density to zero. With respect to contamination, cleaning web transmission densities below 0.3 are excellent, at 0.31 to 0.5 are good, at 0.51 to 0.79 are marginal, and at 0.8 and above are unacceptable.

As to these values, a higher web transmission density indicates an increased fuser offset rate, and thusly a greater degree of contamination. Contamination leads to offset on electrostatographic apparatus parts and on images, and yet additionally reduces roller life.

The values obtained from the gloss and contamination tests are set forth in Table 5 below.

TABLE 5

| Example | Particle size* | Filler level** | Gloss*** | | | Contamination |
| | | | 10K | 200K | 300K | At 200K |
|---|---|---|---|---|---|---|
| 34 | NA | 0 | 7.3 | 7.0 | 7.6 | 0.71 |
| 35 | 12 | 20 | 5.9 | 2.4 | — | 0.78 |
| 36 | 20 | 20 | 6.2 | 2.5 | — | 0.65 |
| 37 | 50 | 33 | 3.0 | 2.7 | 2.4 | 0.38 |
| 38 | 50 | 20 | 5.4 | 3.7 | 3.4 | 0.42 |

*in microns
**as percent by volume of fusing surface layer
***at indicated print count
— not measured The foregoing results demonstrate that 50 um PTFE plastic particles produce a low gloss as well as improved contamination values. The improvement in contamination is achieved in spite of plastic particles being less thermally conductive than metal oxide particles. In addition, the plastic particles maintain a low gloss, as shown over several hundred thousand copies, indicating that the particles are not eroded and smoothed during use.

Finally, although the invention has been described with reference to particular means, materials, and embodiments, it should be noted that the invention is not limited to the particulars disclosed, and extends to all equivalents within the scope of the claims.

What is claimed is:

1. A fuser member for a toner fusing system, comprising:
(a) a fuser base; and
(b) a fusing surface layer comprising;

(i) a fluoroelastomer;
(ii) nonfibrillatable and autoadhesive plastic particles, comprising at least about 25 percent by volume of the fusing surface layer; and
(iii) a discontinuous phase dispersed through the fluoroelastomer continuous phase in the form of domains, said discontinuous phase comprising a polymer comprising an elastomer selected from the group consisting of perfluoropolyethers silicones and fluoroelastomers;

wherein said nonfibrillatable and autoadhesive plastic particles comprises a fluororesin selected from the group consisting of polytetrafluoroethylenes, fluorinated ethylene propylenes, copolymers of tetrafluoroethylene and ethylene and copolymers of tetrafluoroethylene and perfluoroalkyl vinyl ether, wherein said nonfibrillatable and autoadhesive plastic particles comprise a mean particle diameter of from about 0.1 microns to about 20 microns, wherein said fluororesin has a molecular weight of from about 25,000 to about 250,000.

2. The fuser member of claim 1, wherein the nonfibrillatable and autoadhesive plastic particles are dispersed at least essentially uniformly in the fusing surface layer.

3. The fuser member of claim 1, wherein the nonfibrillatable and autoadhesive plastic particles comprise at least about 35 percent by volume of the fusing surface layer.

4. The fuser member of claim 1, wherein the fluoro-resin comprises a member selected from the group consisting of copolymers of tetrafluoroethylene and hexafluoropropylene and copolymers of tetrafluoroethylene and ethylene.

5. The fuser member of claim 1, wherein the polytetrafluoroethylene comprises up to about 5 mole percent of at least one additional monomer.

6. The fuser member of claim 1, wherein the nonfibrillatable and autoadhesive polytetrafluoroethylene particles comprise at least about 35 percent by volume of the fusing surface layer.

7. The fuser member of claim 6, wherein the nonfibrillatable and autoadhesive polytetrafluoroethylene particles comprise from about 43 percent by volume to about 60 percent by volume of the fusing surface layer.

8. The fuser member of claim 1, wherein the fusing surface layer comprises at least about 100 parts of nonfibrillatable and autoadhesive polytetrafluoroethylene particles per 100 parts by weight fluoroelastomer.

9. The fuser member of claim 1, wherein the elastomer comprises a silicone.

10. The fuser member of claim 9, wherein the domains comprise silicone elastomer particulate.

11. The fuser member of claim 10, wherein the silicone elastomer particulate comprise a core-shell configuration, comprising a silicone resin shell surrounding elastomer core.

12. The fuser member of claim 11, wherein the silicone elastomer particulate comprising a core-shell configuration has been prepared by surface treatment, of silicone elastomer particulate, with an aminosilane to provide the shell portion of the core-shell configuration, the aminosilane having the formula

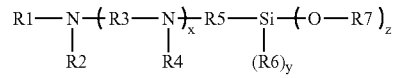

wherein
$R^1$ and $R^2$ are the same or different, and are selected from the group consisting of hydrogen and $C_1$–$C_8$ hydrocarbyl groups;
$R^3$ is a $C_1$–$C_8$ hydrocarbyl group;
$R^4$ is selected from the group consisting of hydrogen and $C_1$–$C_6$ hydrocarbyl groups;
$R^5$ is a $C_3$–$C_8$ hydrocarbyl group;
$R^6$ and $R^7$ are the same or different, and are selected from the group consisting of $C_1$–$C_8$ hydrocarbyl groups;
x is 0 to 2;
y is 0 to 2;
z is 1 to 3; and
y+z is 3.

13. The fuser member of claim 10, wherein the silicone elastomer particulate has a mean particle diameter of from about 0.2 microns to about 40 microns.

14. The fuser member of claim 13, wherein the silicone elastomer particulate comprises from about 10 parts to about 100 parts per 100 parts by weight of the fluoroelastomer.

15. The fuser member of claim 14, wherein, at the temperature of the fusing process, the silicone elastomer particulate has a modulus of from about $0.8 \times 10^6$ Pa to about $8 \times 10^6$ Pa.

16. The fuser member of claim 1, wherein the discontinuous phase has been prepared from a curable polyfunctional poly($C_{1-6}$ alkyl) siloxane polymer.

17. The fuser member of claim 16, wherein the curable polyfunctional poly($C_{1-6}$ alkyl) siloxane polymer comprises a silanol- or trimethylsilyl-terminated polymethylsiloxane, and is a liquid blend comprising about 60–80 weight percent of a difunctional polydimethylsiloxane having a number average molecular weight of about 150,000, and 20–40 weight percent of a polytrimethylsilyl silicate resin having monofunctional and tetrafunctional repeating units in an average ratio of between about 0.8 and 1 to 1, and having a number average molecular weight of about 2,200.

18. The fuser member of claim 16, wherein the curable polyfunctional poly($C_{1-6}$ alkyl) siloxane polymer comprises up to about 60 parts per 100 parts by weight of the fluoroelastomer.

19. The fuser member of claim 18, wherein, at the temperature of the fusing process, the discontinuous phase has a modulus of from about $0.8 \times 10^6$ Pa to about $8 \times 10^6$ Pa.

20. The fuser member of claim 1, wherein said fluoroelastomer comprises two or more monomeric units, with said monomeric units comprising members selected from a group consisting of vinylidene fluoride [—($CH_2CF_2$)—], hexafluoropropylene [—($CF_2CF(CF_3)$)—], tetrafluoroethylene [—($CF_2CF_2$)—], perfluorovinylmethyl ether [—($CF_2CF(OCF_3)$)—], and ethylene [—($CH_2CH_2$)—].

21. The fuser member of claim 1, wherein said fluororesin is polytetrafluoroethylene.

* * * * *